(12) United States Patent
Petrovic et al.

(10) Patent No.: US 9,323,902 B2
(45) Date of Patent: Apr. 26, 2016

(54) CONDITIONAL ACCESS USING EMBEDDED WATERMARKS

(75) Inventors: Rade Petrovic, San Diego, CA (US); Jian Zhao, Montrose, CA (US); Joseph M. Winograd, San Diego, CA (US)

(73) Assignee: Verance Corporation, San Diego, CA (US)

( * ) Notice: Subject to any disclaimer, the term of this patent is extended or adjusted under 35 U.S.C. 154(b) by 898 days.

(21) Appl. No.: 13/324,421

(22) Filed: Dec. 13, 2011

(65) Prior Publication Data

US 2013/0151856 A1 Jun. 13, 2013

(51) Int. Cl.
| | |
|---|---|
| H04L 9/32 | (2006.01) |
| G06F 21/10 | (2013.01) |
| H04N 1/00 | (2006.01) |
| H04N 1/32 | (2006.01) |

(52) U.S. Cl.
CPC .......... *G06F 21/10* (2013.01); *H04N 1/00846* (2013.01); *H04N 1/00854* (2013.01); *H04N 1/00875* (2013.01); *H04N 1/32154* (2013.01); *H04N 1/32203* (2013.01); *G06F 2221/0733* (2013.01); *H04L 2209/608* (2013.01)

(58) Field of Classification Search
CPC .......... H04N 1/3232; H04N 1/32299; H04N 1/32304; H04N 1/00854
USPC .......................................................... 713/176
See application file for complete search history.

(56) References Cited

U.S. PATENT DOCUMENTS

| | | | |
|---|---|---|---|
| 3,406,344 A | 10/1968 | Hopper | |
| 3,842,196 A | 10/1974 | Loughlin | |
| 3,885,217 A | 5/1975 | Cintron | |
| 3,894,190 A | 7/1975 | Gassmann | |
| 3,919,479 A | 11/1975 | Moon et al. | |
| 3,973,206 A | 8/1976 | Haselwood et al. | |
| 4,048,562 A | 9/1977 | Haselwood et al. | |
| 4,176,379 A | 11/1979 | Wessler et al. | |
| 4,199,788 A | 4/1980 | Tsujimura | |

(Continued)

FOREIGN PATENT DOCUMENTS

| | | |
|---|---|---|
| CA | 2276638 A1 | 1/2000 |
| CN | 1447269 | 10/2003 |

(Continued)

OTHER PUBLICATIONS

A watermarking infrastructure for enterprise document management, Cheung et al, IEEE, 2003.*

(Continued)

*Primary Examiner* — Luu Pham
*Assistant Examiner* — Jahangir Kabir
(74) *Attorney, Agent, or Firm* — Perkins Coie LLP; Donald L. Wenskay

(57) ABSTRACT

Methods, devices and computer program products facilitate conditional access to a content embedded with watermarks. For such a content, when copy control rules associated with an embedded watermark message prohibits unconditional access to the content, it is determined whether or not an exception to the copy control rules exists, and if an exception to the copy control rules exists, the content is conditionally accessed. Additional watermark messages can be extracted while the content is being conditionally accessed, and based on the additionally extracted watermark messages, it is verified that conditional access to the content has been fulfilled.

19 Claims, 11 Drawing Sheets

(56) References Cited

U.S. PATENT DOCUMENTS

| | | | |
|---|---|---|---|
| 4,225,967 A | 9/1980 | Miwa et al. |
| 4,230,990 A | 10/1980 | Lert, Jr. et al. |
| 4,281,217 A | 7/1981 | Dolby |
| 4,295,128 A | 10/1981 | Hashemian et al. |
| 4,425,578 A | 1/1984 | Haselwood et al. |
| 4,454,610 A | 6/1984 | Sziklai |
| 4,464,656 A | 8/1984 | Nakamura |
| 4,497,060 A | 1/1985 | Yang |
| 4,512,013 A | 4/1985 | Nash et al. |
| 4,547,804 A | 10/1985 | Greenberg |
| 4,564,862 A | 1/1986 | Cohen |
| 4,593,904 A | 6/1986 | Graves |
| 4,639,779 A | 1/1987 | Greenberg |
| 4,669,089 A | 5/1987 | Gahagan et al. |
| 4,677,466 A | 6/1987 | Lert, Jr. et al. |
| 4,686,707 A | 8/1987 | Iwasaki et al. |
| 4,703,476 A | 10/1987 | Howard |
| 4,706,282 A | 11/1987 | Knowd |
| 4,723,302 A | 2/1988 | Fulmer et al. |
| 4,729,398 A | 3/1988 | Benson et al. |
| 4,739,398 A | 4/1988 | Thomas et al. |
| 4,750,173 A | 6/1988 | Bluthgen |
| 4,755,871 A | 7/1988 | Morales-Garza et al. |
| 4,755,884 A | 7/1988 | Efron et al. |
| 4,764,608 A | 8/1988 | Masuzawa et al. |
| 4,764,808 A | 8/1988 | Solar |
| 4,789,863 A | 12/1988 | Bush |
| 4,805,020 A | 2/1989 | Greenberg |
| 4,807,013 A | 2/1989 | Manocha |
| 4,807,031 A | 2/1989 | Broughton et al. |
| 4,840,602 A | 6/1989 | Rose |
| 4,843,562 A | 6/1989 | Kenyon et al. |
| 4,876,617 A | 10/1989 | Best et al. |
| 4,876,736 A | 10/1989 | Kiewit |
| 4,930,011 A | 5/1990 | Kiewit |
| 4,931,871 A | 6/1990 | Kramer |
| 4,937,807 A | 6/1990 | Weitz et al. |
| 4,939,515 A | 7/1990 | Adelson |
| 4,943,963 A | 7/1990 | Waechter et al. |
| 4,945,412 A | 7/1990 | Kramer |
| 4,967,273 A | 10/1990 | Greenberg |
| 4,969,041 A | 11/1990 | O'Grady et al. |
| 4,972,471 A | 11/1990 | Gross et al. |
| 4,972,503 A | 11/1990 | Zurlinden |
| 4,979,210 A | 12/1990 | Nagata et al. |
| 5,057,915 A | 10/1991 | Von Kohorn |
| 5,073,925 A | 12/1991 | Nagata et al. |
| 5,080,479 A | 1/1992 | Rosenberg |
| 5,113,437 A | 5/1992 | Best et al. |
| 5,116,437 A | 5/1992 | Yamamoto et al. |
| 5,161,251 A | 11/1992 | Mankovitz |
| 5,191,615 A | 3/1993 | Aldava et al. |
| 5,200,822 A | 4/1993 | Bronfin et al. |
| 5,210,820 A | 5/1993 | Kenyon |
| 5,210,831 A | 5/1993 | Emma et al. |
| 5,213,337 A | 5/1993 | Sherman |
| 5,214,792 A | 5/1993 | Alwadish |
| 5,237,611 A | 8/1993 | Rasmussen et al. |
| 5,251,041 A | 10/1993 | Young et al. |
| 5,270,480 A | 12/1993 | Hikawa |
| 5,294,962 A | 3/1994 | Sato et al. |
| 5,294,982 A | 3/1994 | Salomon et al. |
| 5,319,453 A | 6/1994 | Copriviza et al. |
| 5,319,735 A | 6/1994 | Preuss et al. |
| 5,351,304 A | 9/1994 | Yamamoto |
| 5,379,345 A | 1/1995 | Greenberg |
| 5,402,488 A | 3/1995 | Karlock |
| 5,404,160 A | 4/1995 | Schober et al. |
| 5,404,377 A | 4/1995 | Moses |
| 5,408,258 A | 4/1995 | Kolessar |
| 5,414,729 A | 5/1995 | Fenton |
| 5,424,785 A | 6/1995 | Orphan |
| 5,425,100 A | 6/1995 | Thomas et al. |
| 5,432,799 A | 7/1995 | Shimpuku et al. |
| 5,436,653 A | 7/1995 | Ellis et al. |
| 5,450,490 A | 9/1995 | Jensen et al. |
| 5,452,901 A | 9/1995 | Nakada et al. |
| 5,473,631 A | 12/1995 | Moses |
| 5,481,294 A | 1/1996 | Thomas et al. |
| 5,497,372 A | 3/1996 | Nankoh et al. |
| 5,502,576 A | 3/1996 | Ramsay et al. |
| 5,504,518 A | 4/1996 | Ellis et al. |
| 5,508,754 A | 4/1996 | Orphan |
| 5,519,454 A | 5/1996 | Willis |
| 5,523,794 A | 6/1996 | Mankovitz et al. |
| 5,526,427 A | 6/1996 | Thomas et al. |
| 5,537,484 A | 7/1996 | Kobayashi |
| 5,579,124 A | 11/1996 | Aijala et al. |
| 5,581,658 A | 12/1996 | O'Hagan et al. |
| 5,581,800 A | 12/1996 | Fardeau et al. |
| 5,592,553 A | 1/1997 | Guski et al. |
| 5,612,729 A | 3/1997 | Ellis et al. |
| 5,613,004 A | 3/1997 | Cooperman et al. |
| 5,636,292 A | 6/1997 | Rhoads |
| 5,664,018 A | 9/1997 | Leighton |
| 5,687,191 A | 11/1997 | Lee et al. |
| 5,687,236 A | 11/1997 | Moskowitz et al. |
| 5,699,427 A | 12/1997 | Chow et al. |
| 5,719,619 A | 2/1998 | Hattori et al. |
| 5,719,937 A | 2/1998 | Warren et al. |
| 5,737,329 A | 4/1998 | Horiguchi |
| 5,752,880 A | 5/1998 | Gabai et al. |
| 5,761,606 A | 6/1998 | Wolzien |
| 5,764,763 A | 6/1998 | Jensen et al. |
| 5,778,108 A | 7/1998 | Coleman, Jr. |
| 5,787,334 A | 7/1998 | Fardeau et al. |
| 5,805,635 A | 9/1998 | Andrews, Jr. et al. |
| 5,809,064 A | 9/1998 | Fenton et al. |
| 5,809,139 A | 9/1998 | Girod et al. |
| 5,819,289 A | 10/1998 | Sanford, II et al. |
| 5,822,360 A | 10/1998 | Lee et al. |
| 5,822,432 A | 10/1998 | Moskowitz et al. |
| 5,825,892 A | 10/1998 | Braudaway et al. |
| 5,828,325 A | 10/1998 | Wolosewicz et al. |
| 5,832,119 A | 11/1998 | Rhoads |
| 5,841,978 A | 11/1998 | Rhoads |
| 5,848,155 A | 12/1998 | Cox |
| 5,850,249 A | 12/1998 | Massetti et al. |
| 5,850,481 A | 12/1998 | Rhoads |
| 5,862,260 A | 1/1999 | Rhoads |
| 5,870,030 A | 2/1999 | DeLuca et al. |
| 5,887,243 A | 3/1999 | Harvey et al. |
| 5,889,868 A | 3/1999 | Moskowitz et al. |
| 5,892,900 A | 4/1999 | Ginter et al. |
| 5,893,067 A | 4/1999 | Bender et al. |
| 5,901,178 A | 5/1999 | Lee et al. |
| 5,905,800 A | 5/1999 | Moskowitz et al. |
| 5,930,369 A | 7/1999 | Cox et al. |
| 5,933,798 A | 8/1999 | Linnartz |
| 5,937,000 A | 8/1999 | Lee et al. |
| 5,940,124 A | 8/1999 | Janko et al. |
| 5,940,134 A | 8/1999 | Wirtz |
| 5,940,135 A | 8/1999 | Petrovic et al. |
| 5,940,429 A | 8/1999 | Lam et al. |
| 5,943,422 A | 8/1999 | Van Wie et al. |
| 5,945,932 A | 8/1999 | Smith et al. |
| 5,949,885 A | 9/1999 | Leighton |
| 5,960,081 A | 9/1999 | Vynne et al. |
| 5,963,909 A | 10/1999 | Warren et al. |
| 5,986,692 A | 11/1999 | Logan et al. |
| 6,021,432 A | 2/2000 | Sizer, II et al. |
| 6,031,914 A | 2/2000 | Tewfik et al. |
| 6,035,171 A | 3/2000 | Takaya et al. |
| 6,035,177 A | 3/2000 | Moses et al. |
| 6,037,984 A | 3/2000 | Isnardi et al. |
| 6,044,156 A | 3/2000 | Honsinger et al. |
| 6,061,793 A | 5/2000 | Tewfik et al. |
| 6,067,440 A | 5/2000 | Diefes |
| 6,078,664 A | 6/2000 | Moskowitz et al. |
| 6,094,228 A | 7/2000 | Ciardullo et al. |
| 6,101,310 A | 8/2000 | Terada et al. |
| 6,128,597 A | 10/2000 | Kolluru et al. |
| 6,145,081 A | 11/2000 | Winograd et al. |
| 6,154,571 A | 11/2000 | Cox et al. |

(56) References Cited

U.S. PATENT DOCUMENTS

| | | | |
|---|---|---|---|
| 6,160,986 | A | 12/2000 | Gabai et al. |
| 6,173,271 | B1 | 1/2001 | Goodman et al. |
| 6,175,627 | B1 | 1/2001 | Petrovic et al. |
| 6,189,123 | B1 | 2/2001 | Anders Nystrom et al. |
| 6,209,092 | B1 | 3/2001 | Linnartz |
| 6,209,094 | B1 | 3/2001 | Levine et al. |
| 6,222,932 | B1 | 4/2001 | Rao et al. |
| 6,229,572 | B1 | 5/2001 | Ciardullo et al. |
| 6,233,347 | B1 | 5/2001 | Chen et al. |
| 6,246,775 | B1 | 6/2001 | Nakamura et al. |
| 6,246,802 | B1 | 6/2001 | Fujihara et al. |
| 6,249,870 | B1 | 6/2001 | Kobayashi et al. |
| 6,252,972 | B1 | 6/2001 | Linnartz |
| 6,253,113 | B1 | 6/2001 | Lu |
| 6,253,189 | B1 | 6/2001 | Feezell et al. |
| 6,268,866 | B1 | 7/2001 | Shibata |
| 6,278,792 | B1 | 8/2001 | Cox et al. |
| 6,282,299 | B1 | 8/2001 | Tewfik et al. |
| 6,285,774 | B1 | 9/2001 | Schumann et al. |
| 6,289,108 | B1 | 9/2001 | Rhoads |
| 6,290,566 | B1 | 9/2001 | Gabai et al. |
| 6,330,335 | B1 | 12/2001 | Rhoads |
| 6,330,672 | B1 | 12/2001 | Shur |
| 6,332,031 | B1 | 12/2001 | Rhoads et al. |
| 6,332,194 | B1 | 12/2001 | Bloom et al. |
| 6,353,672 | B1 | 3/2002 | Rhoads |
| 6,353,974 | B1 | 3/2002 | Graf |
| 6,363,159 | B1 | 3/2002 | Rhoads |
| 6,373,974 | B2 | 4/2002 | Zeng |
| 6,374,036 | B1 | 4/2002 | Ryan et al. |
| 6,381,341 | B1 | 4/2002 | Rhoads |
| 6,385,330 | B1 | 5/2002 | Powell et al. |
| 6,388,712 | B1 | 5/2002 | Shinohara et al. |
| 6,389,152 | B2 | 5/2002 | Nakamura et al. |
| 6,389,538 | B1 | 5/2002 | Gruse et al. |
| 6,400,826 | B1 | 6/2002 | Chen et al. |
| 6,400,827 | B1 | 6/2002 | Rhoads |
| 6,404,781 | B1 | 6/2002 | Kawamae et al. |
| 6,404,898 | B1 | 6/2002 | Rhoads |
| 6,411,725 | B1 | 6/2002 | Rhoads |
| 6,415,040 | B1 | 7/2002 | Linnartz et al. |
| 6,415,041 | B1 | 7/2002 | Oami et al. |
| 6,424,726 | B2 | 7/2002 | Nakano et al. |
| 6,427,012 | B1 | 7/2002 | Petrovic |
| 6,430,301 | B1 | 8/2002 | Petrovic |
| 6,430,302 | B2 | 8/2002 | Rhoads |
| 6,442,285 | B2 | 8/2002 | Rhoads et al. |
| 6,449,367 | B2 | 9/2002 | Van Wie et al. |
| 6,449,496 | B1 | 9/2002 | Beith et al. |
| 6,473,560 | B1 | 10/2002 | Linnartz et al. |
| 6,477,431 | B1 | 11/2002 | Kalker et al. |
| 6,487,301 | B1 | 11/2002 | Zhao |
| 6,490,355 | B1 | 12/2002 | Epstein |
| 6,496,591 | B1 | 12/2002 | Rhoads |
| 6,505,160 | B1 | 1/2003 | Levy et al. |
| 6,510,233 | B1 | 1/2003 | Nakano |
| 6,510,234 | B1 | 1/2003 | Cox et al. |
| 6,512,837 | B1 | 1/2003 | Ahmed |
| 6,523,113 | B1 | 2/2003 | Wehrenberg |
| 6,529,506 | B1 | 3/2003 | Yamamoto et al. |
| 6,530,021 | B1 | 3/2003 | Epstein et al. |
| 6,535,617 | B1 | 3/2003 | Hannigan et al. |
| 6,550,011 | B1 | 4/2003 | Sims, III |
| 6,553,127 | B1 | 4/2003 | Kurowski |
| 6,556,688 | B1 | 4/2003 | Ratnakar |
| 6,557,103 | B1 | 4/2003 | Boncelet, Jr. et al. |
| 6,570,996 | B1 | 5/2003 | Linnartz |
| 6,571,144 | B1 | 5/2003 | Moses et al. |
| 6,574,350 | B1 | 6/2003 | Rhoads et al. |
| 6,577,744 | B1 | 6/2003 | Braudaway et al. |
| 6,584,138 | B1 | 6/2003 | Neubauer et al. |
| 6,590,996 | B1 | 7/2003 | Reed et al. |
| 6,590,997 | B2 | 7/2003 | Rhoads |
| 6,591,365 | B1 | 7/2003 | Cookson |
| 6,592,516 | B2 | 7/2003 | Lee |
| 6,598,162 | B1 | 7/2003 | Moskowitz |
| 6,614,914 | B1 | 9/2003 | Rhoads et al. |
| 6,618,484 | B1 | 9/2003 | Van Wie et al. |
| 6,625,297 | B1 | 9/2003 | Bradley |
| 6,628,729 | B1 | 9/2003 | Sorensen |
| 6,633,653 | B1 | 10/2003 | Hobson et al. |
| 6,636,615 | B1 | 10/2003 | Rhoads et al. |
| 6,636,967 | B1 | 10/2003 | Koyano |
| 6,647,128 | B1 | 11/2003 | Rhoads |
| 6,647,129 | B2 | 11/2003 | Rhoads |
| 6,654,501 | B1 | 11/2003 | Acharya et al. |
| 6,661,905 | B1 | 12/2003 | Chupp et al. |
| 6,665,419 | B1 | 12/2003 | Oami |
| 6,668,068 | B2 | 12/2003 | Hashimoto |
| 6,671,376 | B1 | 12/2003 | Koto et al. |
| 6,671,388 | B1 | 12/2003 | Op De Beeck et al. |
| 6,674,861 | B1 | 1/2004 | Xu et al. |
| 6,674,876 | B1 | 1/2004 | Hannigan et al. |
| 6,675,146 | B2 | 1/2004 | Rhoads |
| 6,678,389 | B1 | 1/2004 | Sun et al. |
| 6,681,029 | B1 | 1/2004 | Rhoads |
| 6,683,958 | B2 | 1/2004 | Petrovic |
| 6,697,944 | B1 | 2/2004 | Jones et al. |
| 6,700,990 | B1 | 3/2004 | Rhoads |
| 6,704,431 | B1 | 3/2004 | Ogawa et al. |
| 6,707,926 | B1 | 3/2004 | Macy et al. |
| 6,721,439 | B1 | 4/2004 | Levy et al. |
| 6,728,390 | B2 | 4/2004 | Rhoads et al. |
| 6,737,957 | B1 | 5/2004 | Petrovic et al. |
| 6,738,495 | B2 | 5/2004 | Rhoads et al. |
| 6,744,906 | B2 | 6/2004 | Rhoads et al. |
| 6,748,360 | B2 | 6/2004 | Pitman et al. |
| 6,751,337 | B2 | 6/2004 | Tewfik et al. |
| 6,757,405 | B1 | 6/2004 | Muratani et al. |
| 6,757,908 | B1 | 6/2004 | Vogel |
| 6,760,463 | B2 | 7/2004 | Rhoads |
| 6,768,807 | B1 | 7/2004 | Muratani |
| 6,771,797 | B2 | 8/2004 | Ahmed |
| 6,785,399 | B2 | 8/2004 | Fujihara |
| 6,785,401 | B2 | 8/2004 | Walker et al. |
| 6,785,815 | B1 | 8/2004 | Serret-Avila et al. |
| 6,792,542 | B1 | 9/2004 | Lee et al. |
| 6,798,893 | B1 | 9/2004 | Tanaka |
| 6,801,999 | B1 | 10/2004 | Venkatesan et al. |
| 6,810,527 | B1 * | 10/2004 | Conrad et al. ............... 725/76 |
| 6,823,455 | B1 | 11/2004 | Macy et al. |
| 6,829,368 | B2 | 12/2004 | Meyer et al. |
| 6,829,582 | B1 | 12/2004 | Barsness |
| 6,834,344 | B1 | 12/2004 | Aggarwal et al. |
| 6,834,345 | B2 | 12/2004 | Bloom et al. |
| 6,850,555 | B1 | 2/2005 | Barclay |
| 6,850,619 | B1 * | 2/2005 | Hirai ..................... H04N 5/913 380/201 |
| 6,850,626 | B2 | 2/2005 | Rhoads et al. |
| 6,856,693 | B2 | 2/2005 | Miller |
| 6,871,180 | B1 | 3/2005 | Neuhauser et al. |
| 6,880,082 | B2 | 4/2005 | Ohta |
| 6,888,943 | B1 | 5/2005 | Lam et al. |
| 6,891,958 | B2 | 5/2005 | Kirovski et al. |
| 6,912,010 | B2 | 6/2005 | Baker et al. |
| 6,912,294 | B2 | 6/2005 | Wang et al. |
| 6,912,315 | B1 | 6/2005 | Wong et al. |
| 6,915,002 | B2 | 7/2005 | Gustafson |
| 6,915,422 | B1 | 7/2005 | Nakamura |
| 6,915,481 | B1 | 7/2005 | Tewfik et al. |
| 6,928,233 | B1 | 8/2005 | Walker et al. |
| 6,931,536 | B2 | 8/2005 | Hollar |
| 6,944,313 | B1 | 9/2005 | Donescu |
| 6,944,771 | B2 | 9/2005 | Epstein |
| 6,947,571 | B1 | 9/2005 | Rhoads et al. |
| 6,947,893 | B1 | 9/2005 | Iwaki et al. |
| 6,952,774 | B1 | 10/2005 | Kirovski et al. |
| 6,954,541 | B2 | 10/2005 | Fan et al. |
| 6,961,854 | B2 | 11/2005 | Serret-Avila et al. |
| 6,973,195 | B1 | 12/2005 | Matsui |
| 6,993,154 | B2 | 1/2006 | Brunk |
| 6,996,249 | B2 | 2/2006 | Miller et al. |
| 7,007,166 | B1 | 2/2006 | Moskowitz et al. |
| 7,020,304 | B2 | 3/2006 | Alattar et al. |

(56) References Cited

U.S. PATENT DOCUMENTS

| | | |
|---|---|---|
| 7,024,018 B2 | 4/2006 | Petrovic |
| 7,043,049 B2 | 5/2006 | Kuzma |
| 7,043,536 B1 | 5/2006 | Philyaw et al. |
| 7,043,638 B2 | 5/2006 | McGrath et al. |
| 7,046,808 B1 | 5/2006 | Metois et al. |
| 7,054,461 B2 | 5/2006 | Zeller et al. |
| 7,054,462 B2 | 5/2006 | Rhoads et al. |
| 7,058,809 B2 | 6/2006 | White et al. |
| 7,058,815 B2 | 6/2006 | Morin |
| 7,068,809 B2 | 6/2006 | Stach |
| 7,072,492 B2 | 7/2006 | Ogawa et al. |
| 7,103,678 B2 | 9/2006 | Asai et al. |
| 7,107,452 B2 | 9/2006 | Serret-Avila et al. |
| 7,111,169 B2 | 9/2006 | Ripley et al. |
| 7,113,613 B2 | 9/2006 | Echizen et al. |
| 7,123,718 B1 | 10/2006 | Moskowitz et al. |
| 7,142,691 B2 | 11/2006 | Levy |
| 7,162,642 B2 | 1/2007 | Schumann et al. |
| 7,164,778 B1 | 1/2007 | Nakamura et al. |
| 7,167,560 B2 | 1/2007 | Yu |
| 7,167,599 B1 | 1/2007 | Diehl |
| 7,171,020 B2 | 1/2007 | Rhoads et al. |
| 7,177,429 B2 | 2/2007 | Moskowitz et al. |
| 7,197,368 B2 | 3/2007 | Kirovski et al. |
| 7,206,649 B2 | 4/2007 | Kirovski et al. |
| 7,224,819 B2 | 5/2007 | Levy et al. |
| 7,231,061 B2 | 6/2007 | Bradley |
| 7,289,643 B2 | 10/2007 | Brunk et al. |
| 7,298,865 B2 | 11/2007 | Lubin et al. |
| 7,319,759 B1 | 1/2008 | Peinado et al. |
| 7,321,666 B2 | 1/2008 | Kunisa |
| 7,334,247 B1 | 2/2008 | Finseth et al. |
| 7,336,802 B2 | 2/2008 | Kunisa |
| 7,346,514 B2 | 3/2008 | Herre et al. |
| 7,369,677 B2 | 5/2008 | Petrovic et al. |
| 7,369,678 B2 | 5/2008 | Rhoads |
| 7,389,421 B2 | 6/2008 | Kirovski et al. |
| 7,409,073 B2 | 8/2008 | Moskowitz et al. |
| 7,430,670 B1 | 9/2008 | Horning et al. |
| 7,450,727 B2 | 11/2008 | Griesinger |
| 7,454,019 B2 | 11/2008 | Williams |
| 7,562,392 B1 | 7/2009 | Rhoads et al. |
| 7,581,103 B2 | 8/2009 | Home et al. |
| 7,587,601 B2 | 9/2009 | Levy et al. |
| 7,616,776 B2 | 11/2009 | Petrovic et al. |
| 7,617,509 B1 | 11/2009 | Brunheroto et al. |
| 7,630,497 B2 | 12/2009 | Lotspiech et al. |
| 7,644,282 B2 | 1/2010 | Petrovic et al. |
| 7,660,991 B2 | 2/2010 | Nakamura et al. |
| 7,664,332 B2 | 2/2010 | Wong et al. |
| 7,693,297 B2 | 4/2010 | Zhang et al. |
| 7,698,570 B2 | 4/2010 | Schumann et al. |
| 7,756,272 B2 | 7/2010 | Kocher et al. |
| 7,788,684 B2 | 8/2010 | Petrovic et al. |
| 7,788,693 B2 | 8/2010 | Robbins |
| 7,818,763 B2 | 10/2010 | Sie et al. |
| 7,840,006 B2 | 11/2010 | Ogawa et al. |
| 7,979,881 B1 | 7/2011 | Wong et al. |
| 7,983,922 B2 | 7/2011 | Neusinger et al. |
| 7,986,806 B2 | 7/2011 | Rhoads |
| 7,991,995 B2 | 8/2011 | Rabin et al. |
| 8,005,258 B2 | 8/2011 | Petrovic et al. |
| 8,015,410 B2 | 9/2011 | Pelly et al. |
| 8,055,013 B2 | 11/2011 | Levy et al. |
| 8,059,815 B2 | 11/2011 | Lofgren et al. |
| 8,059,858 B2 | 11/2011 | Brundage et al. |
| 8,106,744 B2 | 1/2012 | Petrovic et al. |
| 8,106,745 B2 | 1/2012 | Petrovic et al. |
| 8,138,930 B1 | 3/2012 | Heath |
| 8,151,113 B2 | 4/2012 | Rhoads |
| 8,155,463 B2 | 4/2012 | Wong et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,259,938 B2 | 9/2012 | Petrovic et al. |
| 8,301,893 B2 | 10/2012 | Brundage |
| 8,315,835 B2 | 11/2012 | Tian et al. |
| 8,346,532 B2 | 1/2013 | Chakra et al. |
| 8,346,567 B2 | 1/2013 | Petrovic et al. |
| 8,451,086 B2 | 5/2013 | Petrovic et al. |
| 8,467,717 B2 | 6/2013 | Croy et al. |
| 8,538,066 B2 | 9/2013 | Petrovic et al. |
| 8,589,969 B2 | 11/2013 | Falcon |
| 8,681,978 B2 | 3/2014 | Petriovic et al. |
| 8,791,789 B2 | 7/2014 | Petrovic et al. |
| 2001/0001159 A1 | 5/2001 | Ford |
| 2001/0021926 A1 | 9/2001 | Schneck et al. |
| 2001/0022786 A1 | 9/2001 | King et al. |
| 2001/0025341 A1 | 9/2001 | Marshall |
| 2001/0044899 A1 | 11/2001 | Levy |
| 2001/0051996 A1 | 12/2001 | Cooper et al. |
| 2001/0054146 A1 | 12/2001 | Carro et al. |
| 2002/0007403 A1 | 1/2002 | Echizen et al. |
| 2002/0010684 A1 | 1/2002 | Moskowitz |
| 2002/0012443 A1 | 1/2002 | Rhoads et al. |
| 2002/0019769 A1 | 2/2002 | Barritz et al. |
| 2002/0033844 A1 | 3/2002 | Levy et al. |
| 2002/0044659 A1 | 4/2002 | Ohta |
| 2002/0052885 A1 | 5/2002 | Levy |
| 2002/0053026 A1 | 5/2002 | Hashimoto |
| 2002/0054089 A1 | 5/2002 | Nicholas et al. |
| 2002/0068987 A1 | 6/2002 | Hars |
| 2002/0078356 A1 | 6/2002 | Ezaki et al. |
| 2002/0080964 A1 | 6/2002 | Stone et al. |
| 2002/0080976 A1 | 6/2002 | Schreer |
| 2002/0082731 A1 | 6/2002 | Pitman et al. |
| 2002/0095577 A1 | 7/2002 | Nakamura et al. |
| 2002/0097873 A1 | 7/2002 | Petrovic |
| 2002/0120849 A1 | 8/2002 | McKinley et al. |
| 2002/0120854 A1 | 8/2002 | LeVine et al. |
| 2002/0126842 A1 | 9/2002 | Hollar |
| 2002/0126872 A1 | 9/2002 | Brunk et al. |
| 2002/0138734 A1 | 9/2002 | David et al. |
| 2002/0154144 A1 | 10/2002 | Lofgren et al. |
| 2002/0168087 A1 | 11/2002 | Petrovic |
| 2002/0178368 A1 | 11/2002 | Yin et al. |
| 2002/0199106 A1 | 12/2002 | Hayashi |
| 2003/0009671 A1 | 1/2003 | Yacobi et al. |
| 2003/0012098 A1 | 1/2003 | Sako et al. |
| 2003/0012403 A1 | 1/2003 | Rhoads et al. |
| 2003/0016825 A1 | 1/2003 | Jones |
| 2003/0021439 A1 | 1/2003 | Lubin et al. |
| 2003/0021441 A1 | 1/2003 | Levy et al. |
| 2003/0028796 A1 | 2/2003 | Roberts et al. |
| 2003/0031317 A1 | 2/2003 | Epstein |
| 2003/0033321 A1 | 2/2003 | Schrempp et al. |
| 2003/0037075 A1 | 2/2003 | Hannigan et al. |
| 2003/0053655 A1 | 3/2003 | Barone et al. |
| 2003/0056213 A1 | 3/2003 | McFaddin et al. |
| 2003/0061489 A1 | 3/2003 | Pelly et al. |
| 2003/0063570 A1 | 4/2003 | Katayama et al. |
| 2003/0063747 A1 | 4/2003 | Petrovic |
| 2003/0070075 A1 | 4/2003 | Deguillaume et al. |
| 2003/0072468 A1 | 4/2003 | Brunk et al. |
| 2003/0076955 A1 | 4/2003 | Alve et al. |
| 2003/0078891 A1 | 4/2003 | Capitant |
| 2003/0081780 A1 | 5/2003 | Kim |
| 2003/0081809 A1 | 5/2003 | Fridrich et al. |
| 2003/0112974 A1 | 6/2003 | Levy |
| 2003/0112997 A1 | 6/2003 | Ahmed |
| 2003/0115504 A1 | 6/2003 | Holliman et al. |
| 2003/0131350 A1 | 7/2003 | Peiffer et al. |
| 2003/0152225 A1 | 8/2003 | Kunisa |
| 2003/0174862 A1 | 9/2003 | Rhoads et al. |
| 2003/0177359 A1 | 9/2003 | Bradley |
| 2003/0179901 A1 | 9/2003 | Tian et al. |
| 2003/0185417 A1 | 10/2003 | Alattar et al. |
| 2003/0187679 A1 | 10/2003 | Odgers et al. |
| 2003/0188166 A1 | 10/2003 | Pelly et al. |
| 2003/0190054 A1 | 10/2003 | Troyansky et al. |
| 2003/0190055 A1 | 10/2003 | Kalker et al. |
| 2003/0191941 A1 | 10/2003 | Terada et al. |
| 2003/0200438 A1 | 10/2003 | Kirovski et al. |
| 2003/0223584 A1 | 12/2003 | Bradley et al. |

(56) References Cited

U.S. PATENT DOCUMENTS

| | | |
|---|---|---|
| 2004/0005076 A1 | 1/2004 | Hosaka et al. |
| 2004/0008864 A1 | 1/2004 | Watson et al. |
| 2004/0009763 A1 | 1/2004 | Stone et al. |
| 2004/0010692 A1 | 1/2004 | Watson |
| 2004/0015400 A1 | 1/2004 | Whymark |
| 2004/0025023 A1 | 2/2004 | Yamada et al. |
| 2004/0025176 A1 | 2/2004 | Franklin et al. |
| 2004/0028255 A1 | 2/2004 | Miller |
| 2004/0042635 A1 | 3/2004 | Epstein et al. |
| 2004/0042636 A1 | 3/2004 | Oh |
| 2004/0073916 A1 | 4/2004 | Petrovic et al. |
| 2004/0078575 A1 | 4/2004 | Morten et al. |
| 2004/0088556 A1 | 5/2004 | Weirauch |
| 2004/0091111 A1 | 5/2004 | Levy et al. |
| 2004/0093202 A1 | 5/2004 | Fischer et al. |
| 2004/0093523 A1 | 5/2004 | Matsuzaki et al. |
| 2004/0098593 A1 | 5/2004 | Muratani |
| 2004/0101160 A1 | 5/2004 | Kunisa |
| 2004/0103293 A1 | 5/2004 | Ryan |
| 2004/0111740 A1 | 6/2004 | Seok et al. |
| 2004/0120544 A1 | 6/2004 | Eguchi et al. |
| 2004/0133794 A1 | 7/2004 | Kocher et al. |
| 2004/0136531 A1 | 7/2004 | Asano et al. |
| 2004/0151316 A1 | 8/2004 | Petrovic |
| 2004/0169581 A1 | 9/2004 | Petrovic et al. |
| 2004/0174996 A1 | 9/2004 | Tewfik et al. |
| 2004/0202324 A1 | 10/2004 | Yamaguchi et al. |
| 2004/0204943 A1 | 10/2004 | Kirovski et al. |
| 2004/0216157 A1 | 10/2004 | Shain et al. |
| 2004/0250078 A1 | 12/2004 | Stach et al. |
| 2004/0258274 A1 | 12/2004 | Brundage et al. |
| 2004/0260930 A1 | 12/2004 | Malik et al. |
| 2005/0008190 A1 | 1/2005 | Levy et al. |
| 2005/0010779 A1 | 1/2005 | Kobayashi et al. |
| 2005/0013462 A1 | 1/2005 | Rhoads |
| 2005/0025332 A1 | 2/2005 | Seroussi |
| 2005/0050332 A1 | 3/2005 | Serret-Avila et al. |
| 2005/0071283 A1 | 3/2005 | Randle et al. |
| 2005/0071669 A1 | 3/2005 | Medvinsky et al. |
| 2005/0120220 A1 | 6/2005 | Oostveen et al. |
| 2005/0144632 A1 | 6/2005 | Mears et al. |
| 2005/0154891 A1 | 7/2005 | Skipper |
| 2005/0177861 A1 | 8/2005 | Ma et al. |
| 2005/0196051 A1 | 9/2005 | Wong et al. |
| 2005/0202781 A1 | 9/2005 | Steelberg et al. |
| 2005/0242568 A1 | 11/2005 | Long et al. |
| 2005/0251683 A1 | 11/2005 | Levy et al. |
| 2005/0267928 A1 | 12/2005 | Anderson et al. |
| 2006/0005029 A1 | 1/2006 | Petrovic et al. |
| 2006/0056653 A1 | 3/2006 | Kunisa |
| 2006/0062426 A1 | 3/2006 | Levy et al. |
| 2006/0075424 A1 | 4/2006 | Talstra et al. |
| 2006/0104477 A1 | 5/2006 | Isogai et al. |
| 2006/0190403 A1 | 8/2006 | Lin et al. |
| 2006/0227968 A1 | 10/2006 | Chen et al. |
| 2006/0239501 A1 | 10/2006 | Petrovic et al. |
| 2007/0003103 A1 | 1/2007 | Lemma et al. |
| 2007/0005500 A1 | 1/2007 | Steeves et al. |
| 2007/0033146 A1 | 2/2007 | Hollar |
| 2007/0039018 A1 | 2/2007 | Saslow et al. |
| 2007/0100483 A1 | 5/2007 | Kentish et al. |
| 2007/0110237 A1 | 5/2007 | Tehranchi et al. |
| 2007/0143617 A1 | 6/2007 | Farber et al. |
| 2007/0150418 A1 | 6/2007 | Ben-Menahem et al. |
| 2007/0168673 A1 | 7/2007 | Van Der Veen et al. |
| 2007/0177761 A1 | 8/2007 | Levy |
| 2007/0192261 A1 | 8/2007 | Kelkar et al. |
| 2007/0208711 A1 | 9/2007 | Rhoads et al. |
| 2007/0214049 A1 | 9/2007 | Postrel |
| 2007/0223708 A1 | 9/2007 | Villemoes et al. |
| 2008/0002854 A1 | 1/2008 | Tehranchi et al. |
| 2008/0016360 A1 | 1/2008 | Rodriguez et al. |
| 2008/0031463 A1 | 2/2008 | Davis |
| 2008/0037825 A1* | 2/2008 | Lofgren ............ G06F 17/30241 382/100 |
| 2008/0209219 A1 | 8/2008 | Rhein |
| 2008/0219643 A1* | 9/2008 | Le Buhan et al. ................ 386/95 |
| 2008/0228733 A1 | 9/2008 | Davis et al. |
| 2008/0250240 A1 | 10/2008 | Celik et al. |
| 2008/0273861 A1 | 11/2008 | Yang et al. |
| 2008/0281448 A1 | 11/2008 | Uhrig et al. |
| 2008/0298632 A1 | 12/2008 | Reed |
| 2008/0301304 A1 | 12/2008 | Chitsaz et al. |
| 2008/0310629 A1 | 12/2008 | Van Der Veen et al. |
| 2008/0310673 A1* | 12/2008 | Petrovic et al. ................ 382/100 |
| 2008/0313741 A1 | 12/2008 | Alve et al. |
| 2009/0031134 A1 | 1/2009 | Levy |
| 2009/0033617 A1 | 2/2009 | Lindberg et al. |
| 2009/0100492 A1 | 4/2009 | Hicks, III et al. |
| 2009/0136082 A1 | 5/2009 | Zandifar et al. |
| 2009/0158318 A1 | 6/2009 | Levy |
| 2009/0172405 A1 | 7/2009 | Shiomi et al. |
| 2009/0175594 A1 | 7/2009 | Ann et al. |
| 2009/0177674 A1 | 7/2009 | Yoshida |
| 2009/0208008 A1 | 8/2009 | Lubin |
| 2009/0262932 A1 | 10/2009 | Petrovic |
| 2009/0319639 A1 | 12/2009 | Gao et al. |
| 2009/0326961 A1 | 12/2009 | Petrovic et al. |
| 2010/0011217 A1 | 1/2010 | Tachibana et al. |
| 2010/0023489 A1 | 1/2010 | Miyata et al. |
| 2010/0034513 A1 | 2/2010 | Nakano et al. |
| 2010/0069151 A1* | 3/2010 | Suchocki ........................ 463/31 |
| 2010/0111355 A1 | 5/2010 | Petrovic et al. |
| 2010/0115267 A1 | 5/2010 | Guo et al. |
| 2010/0121608 A1 | 5/2010 | Tian et al. |
| 2010/0146286 A1 | 6/2010 | Petrovic et al. |
| 2010/0159425 A1 | 6/2010 | Hamlin |
| 2010/0162352 A1 | 6/2010 | Haga et al. |
| 2010/0214307 A1 | 8/2010 | Lee et al. |
| 2010/0226525 A1 | 9/2010 | Levy et al. |
| 2010/0228632 A1 | 9/2010 | Rodriguez |
| 2010/0228857 A1 | 9/2010 | Petrovic et al. |
| 2010/0287579 A1 | 11/2010 | Petrovic et al. |
| 2010/0287609 A1 | 11/2010 | Gonzalez et al. |
| 2010/0332723 A1 | 12/2010 | Lin et al. |
| 2011/0016172 A1 | 1/2011 | Shah |
| 2011/0068898 A1 | 3/2011 | Petrovic et al. |
| 2011/0091066 A1 | 4/2011 | Alattar |
| 2011/0103444 A1 | 5/2011 | Baum et al. |
| 2011/0123063 A1 | 5/2011 | Delp et al. |
| 2011/0173210 A1 | 7/2011 | Ahn et al. |
| 2011/0194727 A1 | 8/2011 | Guo et al. |
| 2011/0202687 A1 | 8/2011 | Glitsch et al. |
| 2011/0202844 A1 | 8/2011 | Davidson et al. |
| 2011/0209191 A1 | 8/2011 | Shah |
| 2011/0214044 A1 | 9/2011 | Davis et al. |
| 2011/0214143 A1 | 9/2011 | Rits et al. |
| 2011/0216936 A1 | 9/2011 | Reed et al. |
| 2011/0219229 A1 | 9/2011 | Cholas et al. |
| 2011/0225427 A1 | 9/2011 | Wood et al. |
| 2011/0235908 A1 | 9/2011 | Ke et al. |
| 2011/0255690 A1 | 10/2011 | Kocher et al. |
| 2011/0286625 A1 | 11/2011 | Petrovic et al. |
| 2011/0293090 A1 | 12/2011 | Ayaki et al. |
| 2011/0311056 A1 | 12/2011 | Winograd |
| 2011/0320627 A1 | 12/2011 | Landow et al. |
| 2012/0017091 A1 | 1/2012 | Petrovic et al. |
| 2012/0023595 A1 | 1/2012 | Speare et al. |
| 2012/0026393 A1 | 2/2012 | Petrovic et al. |
| 2012/0072729 A1 | 3/2012 | Winograd et al. |
| 2012/0072730 A1 | 3/2012 | Winograd et al. |
| 2012/0072731 A1 | 3/2012 | Winograd et al. |
| 2012/0084870 A1 | 4/2012 | Petrovic |
| 2012/0122429 A1 | 5/2012 | Wood et al. |
| 2012/0129547 A1 | 5/2012 | Andrews, III et al. |
| 2012/0130719 A1 | 5/2012 | Petrovic et al. |
| 2012/0203556 A1 | 8/2012 | Villette et al. |
| 2012/0203734 A1 | 8/2012 | Spivack et al. |
| 2012/0216236 A1 | 8/2012 | Robinson et al. |
| 2012/0265735 A1 | 10/2012 | McMillan et al. |
| 2012/0272012 A1 | 10/2012 | Aronovich et al. |
| 2012/0272327 A1 | 10/2012 | Shin et al. |
| 2012/0300975 A1 | 11/2012 | Chalamala et al. |
| 2012/0300977 A1 | 11/2012 | Petrovic et al. |

(56) References Cited

U.S. PATENT DOCUMENTS

| | | |
|---|---|---|
| 2012/0304206 A1 | 11/2012 | Roberts et al. |
| 2012/0308071 A1 | 12/2012 | Ramsdell et al. |
| 2013/0007462 A1 | 1/2013 | Petrovic et al. |
| 2013/0011006 A1 | 1/2013 | Petrovic et al. |
| 2013/0031579 A1 | 1/2013 | Klappert |
| 2013/0060837 A1 | 3/2013 | Chakraborty et al. |
| 2013/0073065 A1 | 3/2013 | Chen et al. |
| 2013/0108101 A1 | 5/2013 | Petrovic et al. |
| 2013/0114847 A1 | 5/2013 | Petrovic et al. |
| 2013/0114848 A1 | 5/2013 | Petrovic et al. |
| 2013/0117570 A1 | 5/2013 | Petrovic et al. |
| 2013/0117571 A1 | 5/2013 | Petrovic et al. |
| 2013/0129303 A1 | 5/2013 | Lee et al. |
| 2013/0132727 A1 | 5/2013 | Petrovic |
| 2013/0142382 A1 | 6/2013 | Petrovic et al. |
| 2013/0151855 A1 | 6/2013 | Petrovic et al. |
| 2013/0152210 A1 | 6/2013 | Petrovic et al. |
| 2013/0283402 A1 | 10/2013 | Petrovic |
| 2013/0339029 A1 | 12/2013 | Petrovic et al. |
| 2014/0029786 A1 | 1/2014 | Winograd |
| 2014/0067950 A1 | 3/2014 | Winograd |
| 2014/0071342 A1 | 3/2014 | Winograd et al. |
| 2014/0074855 A1 | 3/2014 | Zhao et al. |
| 2014/0075465 A1 | 3/2014 | Petrovic et al. |
| 2014/0075466 A1 | 3/2014 | Zhao |
| 2014/0075469 A1 | 3/2014 | Zhao |
| 2014/0229963 A1 | 8/2014 | Petrovic et al. |
| 2014/0237628 A1 | 8/2014 | Petrovic |
| 2014/0267907 A1 | 9/2014 | Downes et al. |
| 2014/0270337 A1 | 9/2014 | Zhao et al. |
| 2014/0270338 A1 | 9/2014 | Zhao et al. |
| 2014/0279296 A1 | 9/2014 | Petrovic et al. |
| 2014/0279549 A1 | 9/2014 | Petrovic et al. |
| 2014/0325550 A1 | 10/2014 | Winograd et al. |
| 2014/0325673 A1 | 10/2014 | Petrovic |
| 2014/0355817 A1 | 12/2014 | Wong et al. |
| 2014/0376723 A1 | 12/2014 | Petrovic |
| 2015/0016228 A1 | 1/2015 | Petrovic et al. |
| 2015/0016663 A1 | 1/2015 | Tehranchi et al. |
| 2015/0030200 A1 | 1/2015 | Petrovic et al. |
| 2015/0036873 A1 | 2/2015 | Petrovic et al. |
| 2015/0121534 A1 | 4/2015 | Zhao et al. |

FOREIGN PATENT DOCUMENTS

| | | |
|---|---|---|
| CN | 1556987 | 12/2004 |
| CN | 101001354 | 7/2007 |
| EP | 282734 A1 | 9/1988 |
| EP | 372601 A1 | 6/1990 |
| EP | 581317 A2 | 2/1994 |
| EP | 2166725 | 3/2010 |
| EP | 2605485 | 6/2013 |
| EP | 2653964 | 10/2013 |
| EP | 2782337 | 9/2014 |
| GB | 2260246 A | 4/1993 |
| GB | 2292506 A | 2/1996 |
| GB | 2358313 | 7/2001 |
| GB | 2363027 A | 12/2001 |
| JP | 10-150548 A | 6/1998 |
| JP | 11-086435 A | 3/1999 |
| JP | 11-284516 | 10/1999 |
| JP | 11-284516 A | 10/1999 |
| JP | 11-346302 | 12/1999 |
| JP | 11-346302 A | 12/1999 |
| JP | 2000-069273 A | 3/2000 |
| JP | 2000-174628 A | 6/2000 |
| JP | 2000163870 | 6/2000 |
| JP | 2000174628 | 6/2000 |
| JP | 2001022366 | 1/2001 |
| JP | 2001-119555 A | 4/2001 |
| JP | 2001-188549 A | 7/2001 |
| JP | 2001-216763 A | 8/2001 |
| JP | 2001-218006 A | 8/2001 |
| JP | 2001245132 | 9/2001 |
| JP | 2001257865 | 9/2001 |
| JP | 2001-312570 | 11/2001 |
| JP | 2001-527660 A | 12/2001 |
| JP | 2001339700 | 12/2001 |
| JP | 2002-010057 A | 1/2002 |
| JP | 2002-024095 A | 1/2002 |
| JP | 2002-027223 | 1/2002 |
| JP | 2002-027223 A | 1/2002 |
| JP | 2002-091465 A | 3/2002 |
| JP | 2002091712 | 3/2002 |
| JP | 2002100116 | 4/2002 |
| JP | 2002125205 | 4/2002 |
| JP | 2002135557 | 5/2002 |
| JP | 2002-165191 A | 6/2002 |
| JP | 2002176614 | 6/2002 |
| JP | 2002-519916 A | 7/2002 |
| JP | 2002-232693 A | 8/2002 |
| JP | 2002319924 | 10/2002 |
| JP | 2002354232 | 12/2002 |
| JP | 2003-008873 A | 1/2003 |
| JP | 2003-039770 A | 2/2003 |
| JP | 2003-091927 A | 3/2003 |
| JP | 2003134461 | 5/2003 |
| JP | 2003-230095 A | 8/2003 |
| JP | 2003-244419 A | 8/2003 |
| JP | 2003-283802 A | 10/2003 |
| JP | 2003316556 | 11/2003 |
| JP | 2003348324 | 12/2003 |
| JP | 2004-023786 A | 1/2004 |
| JP | 2004023786 | 1/2004 |
| JP | 2004070606 | 3/2004 |
| JP | 2004-163855 A | 6/2004 |
| JP | 2004-193843 A | 7/2004 |
| JP | 2004194233 | 7/2004 |
| JP | 2004-328747 A | 11/2004 |
| JP | 2004328747 | 11/2004 |
| JP | 2005051733 | 2/2005 |
| JP | 2005-094107 A | 4/2005 |
| JP | 2005094107 | 4/2005 |
| JP | 2005525600 | 8/2005 |
| JP | 20080539669 | 11/2008 |
| JP | 20100272920 | 12/2010 |
| JP | 5283732 | 7/2013 |
| KR | 1020080087047 | 9/2008 |
| KR | 20100009384 | 1/2010 |
| KR | 1020120128149 | 11/2012 |
| WO | 94-10771 | 5/1994 |
| WO | 95-14289 | 5/1995 |
| WO | 97-09797 | 3/1997 |
| WO | 97-33391 | 9/1997 |
| WO | 98-53565 | 11/1998 |
| WO | 99-03340 | 1/1999 |
| WO | 99-39344 | 5/1999 |
| WO | 99-45706 | 10/1999 |
| WO | 99-62022 | 12/1999 |
| WO | 00-00969 | 1/2000 |
| WO | 00-13136 | 3/2000 |
| WO | 00-56059 | 9/2000 |
| WO | 01-54035 | 7/2001 |
| WO | 0150665 | 7/2001 |
| WO | 01-55889 | 8/2001 |
| WO | 0197128 | 12/2001 |
| WO | 0213138 | 2/2002 |
| WO | 02-23883 | 3/2002 |
| WO | 0219589 | 3/2002 |
| WO | 03-052598 | 6/2003 |
| WO | 03102947 | 12/2003 |
| WO | 2005017827 | 2/2005 |
| WO | 2005-027501 | 3/2005 |
| WO | 2005038778 | 4/2005 |
| WO | 2006051043 | 5/2006 |
| WO | 2006116394 | 11/2006 |
| WO | 2009031082 | 3/2009 |
| WO | 2010073236 | 7/2010 |
| WO | 2010135687 | 11/2010 |
| WO | 2011116309 | 9/2011 |
| WO | 2013067439 | 5/2013 |
| WO | 2013090462 | 6/2013 |
| WO | 2013090466 | 6/2013 |

(56) References Cited

FOREIGN PATENT DOCUMENTS

| WO | 2013090467 | 6/2013 |
|---|---|---|
| WO | 2013163921 | 11/2013 |
| WO | 2014144101 | 9/2014 |
| WO | 2014153199 | 9/2014 |
| WO | 2014160324 | 10/2014 |
| WO | 2015013419 | 1/2015 |

OTHER PUBLICATIONS

Digital rights management and watermarking of multimedia content for m-commerce applications, Hartung et al, IEEE, 2000.*
Lacy, C., et al., "Intellectual Property Protection Systems and Digital Watermarking," Proceedings: Information Hiding, Second International Workshop, Portland, OR, pp. 158-168, 1998.
Lin et al., "Detection of image alterations using semi-fragile watermarks", Proceedings of the SPIE International Conference on Security and Watermarking of Multimedia Contents II, vol. 3971, USA, Jan. 2000 (12 pages).
Lin, P.L., "Robust transparent image watermarking system with spatial mechanisms," The Journal of Systems and Software, vol. 50, Feb. 2000, pp. 107-116.
Lotspeich, J., "The Advanced Access Content System's Use of Digital Watermarking," MCPS '06, Oct. 28, 2006, pp. 19-21.
Lu, Chun-Shien et al., "Oblivious Cocktail Watermarking by Sparse Code Shrinkage: A Regional- and Global-Based Scheme", ICIP, 2000 (vol. III: 13-16).
Mason, A., et al., "User Requirements for Watermarking in Broadcast Applications", IEEE Conference Publication, International Broadcasting Convention (!BC 2000), Amsterdam, Sep. 8-12, 2000 (7 pages).
"Microsoft Response to CfP for Technology Solutions to Screen Digital Audio Content for LCM Acceptance," Microsoft Corp., May 23, 1999.
Mintzer, et al., "An Invisible Watermarking Technique for Image Verification," 1997, pp. 680-683.
Mintzer et al., "If one watermak is good, are more better?", Acoustics, Speech, and Signal Processing, 1999. ICASSP'99., Publication Date Mar. 15-19, 1999, vol. 4, on pp. 2067-2069.
Mobasseri. B.G .. et al. "Content Authentication and Tamper Detection in Digital Video". Image Processing. 2000. Proceedings. 2000 International Conference. vol. 1.2000. p. 458-461.
Moulin, P., et al., "Detection-Theoretic Analysis of Desynchronization Attacks in Watermarking," Tech. Rep. MSR-TR-2002-24, Microsoft Research (Mar. 2002).
Muranoi, R., et al., "Video Retrieval Method using ShotID for Copyright Protection Systems," Proc. SPIE vol. 3527: Multimedia Storage and Archiving Systems III, Nov. 1998, pp. 245-252.
Nikolaidis et al., Watermark Detection: Benchmarking Perspectives, 2002 IEEE Conference on Multimedia and Expo (ICME 2002).
Office action dated Jul. 21, 2011 in Japanese Application 2008-508985.
Office Action dated Mar. 18, 2011 in European Application 03774648.4.
Park et al, "Robust and Fragile Watermarking Techniques for Documents Using Bidirectional Diagonal Profiles", Information and Communications Security: Third International Conference, ICICS 2001, Xian, China, Nov. 13-16, 2001, pp. 483-494.
Perez-Gonzalez, et al., "Approaching the capacity limit in image watermarking a perspective on coding techniques for data hiding applications", Signal Processing, vol. 81, No. 6, Jun. 2001, pp. 1215-1238 (24).
Petitcolas, F. A. P.., et al., "Attacks on Copyright Marking Systems" Second Workshop on Informa tion . Hiding, vol. 1525 of Lecture Notes in Computer Science, pp. 218-238, Apr. 1998.
Philips Research Liquid Audio Fraunhofer Institute, "Digital Audio Screening Technology for Phased Rollout," v. 1.0, May 23, 1999.
Pytlak, John P. "Anti-Piracy Coding," URL: http://www.tele.com/pipermail/tig/2003-November/003842.html; Nov. 13, 2003 (2 pages).
RSA Laboratory, "Frequently Asked Questions About Today's Cryptography," Version 4.1, May 2000, pp. 1; 20-33; 54-58; 74-75; 87-88; 101-102; 106-110 and 113-118.
Schneier, B., "Applied Cryptography, Second Edition: Protocols, Algorithms and Source Code in C," Oct. 1995, pp. 9-10, 29-31, 79-80.
Shih et al., "Combinational, image watermarking in the spatial and frequency domains", Pattern Recognition Society 36 pp. 969-975 (2002).
Solanki et ai, "Robust Image-Adaptive Data Hiding: Modeling, Source Coding, and Channel Coding", 41st Allerton Conference on Communications, Control, and Computing, Oct. 2003.
Steinebach, M., et al., "StirMark Benchmark: Audio Watermarking Attacks", Int. Conference on Information Technology: Coding and Computing (ITCC 2001), Apr. 2-4, Las Vegas, Nevada, pp. 49-54, ISBN 0/7695-1062-0, 2001.
Tanaka, K. et al. "Secret transmission method of character data in motion picture communication", SPIE vol. 1605, Visual Communications and Image Processing '91, Visual Communication. pp. 646-649, 1991.
TASK AC122—Copy Protection for Distribution Services, Jul. 1, 1997, Http://acad.bg/WISE/english/rd/partners/acts/arealtac122-thtml.
Tsai, et al., "Wavelet packet and adaptive spatial transformation of watermark for digital image authentication", IEEE, Image Processing, 2000, Proceedings. 2000 International Conference on, Publication Date: 2000, vol. 1, on pp. 450-453 vol. 1, abstract, p. 452, section 2, pp. 450-452, section 2.
Verance Corporation, "Confirmedia", PowerPoint presentation made to National Association of Broadcasters; Apr. 24, 2001 (40 pages).
Xu, C., et al., "Applications of digital watermarking technology in audio signals", J. Audio Eng. Soc., vol. 47, No. 10, pp. 805-812, Oct. 1999.
Yeung, et al., "An Invisible Watermarking Technique for Image Verification," 1997, pp. 680-683.
Zhao, J., "Applying Digital Watermarking Techniques to Online Multimedia Commerce," Proc. Int. Conf. on Imaging Science, Systems and Applications (CISSA'97), Jun./Jul. 1997, 7 pages.
Zhao, J., "A WWW Service to Embed and Prove Digital Copyright Watermarks," Proc. European Conf. on Multimedia Applications, Services and Techniques (ECMAST'96), May 1996, pp. 695-710.
Adelsbach, A., et al., "Proving Ownership of Digital Content," Proc. 3rd Int. Workshop on Information Hiding, LNCS vol. 1768, Sep./Oct. 1999, pp. 117,133.
Advanced Access Content System (AACS), Pre-recorded Video Book, Revision 0.951, Sep. 28, 2009, 88 pages total.
Aggarwal, et al., "Multi-Layer Grid Embeddings," IEEE, 1985, pp. 186-196.
"Audio Watermarking System to Screen Digital Audio Content for LCM Acceptance," Aris Technologies, Inc., May 23, 1999.
Barreto, et al. "Toward Secure Public-Key Blockwise Fragile Authentication Watermarking", IEEE Proceedings—Vision, Image, and Signal Processing—Apr. 2002, vol. 149, Issue 2, p. 57-62.
Boney, L., et al., "Digital Watermarks for Audio Signals," Dept. of Electrical Engineering, Univ. of Minnesota, Mar. 27, 1996.
Caronni, Germano,"Assuring Ownership Rights for Digital Images", Proceedings of 'reliable IT systems' VIS 95, H.H. Bruggermann and W. Gerhardt-Hackl (Ed.), Vieweg Publishing Company, Germany, 1995.
Chen, B. and G.W. Wornell, "Quantization index modulation: a class of provably good methods for digital watermarking and information embedding," IEEE Transactions on Information Theory, vol. 47, No. 4, pp. 1423-1443, 2001.
Chou, J. et al., "A Robust Optimization Solution to the Data Hiding Problem using Distributed Source Coding Principles", Pro. SPIE, vol. 3971, San Jose, CA (Jan. 2000) (10 pages).
Chou, J., et al., "A Robust Blind Watermarking Scheme based on Distributed Source Coding Principles", ACM Multimedia 2000 Los Angeles, CA USA.
Cinea Inc., "Forensic watermarking", 2004. [http://www.cinea.com/whitepapers/forensic_watermarking.pdf] (9 pages).
International Search Report for PCT Application No. PCT/US98/09587 dated Aug. 14, 1998.

(56) References Cited

OTHER PUBLICATIONS

International Search Report for PCT Application No. PCT/US01/26505 dated Feb. 14, 2002.
International Search Report for PCT Application No. PCT/US03/31816 dated May 19, 2004.
International Search Report for PCT Application No. PCT/US06/31267 dated Aug. 22, 2007.
International Search Report for PCT/US2006/015615 dated Jan. 4, 2008.
International Search Report for PCT Application No. PCT/US06/25090 dated May 13, 2008.
International Search Report for PCT Application No. PCT/US06/15410 dated May 29, 2008.
International Search Report for PCT Application No. PCT/US07/16812 dated Sep. 26, 2008.
M. Costa, "Writing on Dirty Paper" IEEE Trans. on Info. Theory, IT-29, No. 3, pp. 439-441 (May 1983) (3 pages).
Cox, I. J. and J. P. M. G. Linnartz, "Some General Methods for Tampering with Watermarks" IEEE Journal on Selected Areas in Communications, vol. 16, No. 4, May 1998, pp. 587-593.
Coxford, A., et al., "Advanced Mathematics: A Preparation for Calculus, Second Edition," 1978, pp. 35-46.
Davidson, M.F., "Music File Filter," Sony Music, New York, May 23, 1999.
Das, et al., "Distributed Priority Queues on Hybercube Architectures," IEEE, 1996, pp. 620-627.
Digimarc®Watermarking Guide, ©1999 Digimarc Corporation, 22 pages.
Dittmann, J., "Combining digital watermarks and collusion secure fingerprints for digital images," Proc. SPIE vol. 3657: Security and Watermarking of Multimedia Contents, Jan. 1999, pp. 171-182.
Dittmann, J., "Combining digital watermarks and collusion secure fingerprints for customer copy monitoring", Proc. IEEE Seminar on Secure Images and Image Authentication, Apr. 2000, pp. 6/1-6/6.
Epp et al., "Generalized Scattering Matrices for Unit Cell Characterization of Grid Amplifiers and Device De-Embedding", IEEE vol. 2, Jun. 1995, pp. 1288-1291.
European Search Report for European Application No. 03774648.4 dated Nov. 10, 2010.
Furon, T. and P. Duhamel, "An asymmetric watermarking method", IEEE Trans. Signal Processing, vol. 51, No. 4, Apr. 2003, pp. 981-995.
Guth, H. J. et al., "Error- and Collusion-Secure Fingerprinting for Digital Data," Proc. 3rd Int. Workshop on Information . Hiding, LNCS vol. 1768, Sep./Oct. 1999, pp. 134-145.
Hartung, F., et al., "Watermarking of MPEG-2 encoded video without decoding and re-coding," Proc. SPIE vol. 3020: Multimedia Computing and Networking 97, Feb. 1997, pp. 264-274.
Hartung, F., et al., "Digital Watermarking of MPEG-2 Coded Video in the Bitstream Domain," Proc. IEEE Int. Conf. on Acoustics, Speech and Signal Processing, Apr. 1997, pp. 2621-2624.
Hartung, F., et al., "Watermarking of uncompressed and compressed video," Signal Processing, vol. 66, May 1998, pp. 283-301.
Heegard, C. et al., "On the Capacity of Computer Memory with Defects", IEEE Trans. Info. Theory, vol. IT-29, No. 5, pp. 731-739 (Sep. 1983) (9 pages).
http://www.cryptography.com/technology/spdc/index.html.
International Search Report for PCT/US06/015615 dated Jan. 4, 2008.
International Search Report for PCT/US06/015410 dated May 29, 2008.
Jacobsmeyer, Jay, "Introduction to Error-Control Coding," Pericle Communications Company, 2004 (16 pages).
Kalker, T., "A security risk for publicly available watermark detectors", Proc. Benelux Info. Theory Symp., Veldhoven, The Netherlands, May 1998.
Kalker T., "System Issues in Digital Image and Video Watermarking for Copy Protection," Proc. IEEE Int. Conf. on Multimedia Computing and Systems, Jun. 1999, pp. 562-567.

Kang et al, "A DWT-DFT Composite Watermarking Scheme Robust to 80th Affine Transform and JPEG Compression", IEEE Transactions on Circuits and Systems for Video Technology, vol. 13, No. 8, Aug. 2003
Kim, T.Y., et al. "An Asymmetric Watermarking System With Many Embedding Watermarks Corresponding to One Detection Watermark", IEEE signal processing letters, vol. 11, No. 3, Mar. 2004.
Kirovski et al., "Multimedia Content Screening using a Dual Watermarking and Fingerprinting System", Proceedings of the tenth ACM international conference, pp. 372-381, 2002.
D. Kirovski and F.A.P. Petitcolas, "The blind pattern matching attack on watermark systems," IEEE Trans. Signal Processing, Apr. 2003.
Kirovski et al., "Randomizing the replacement attack", ICASSP, 2004, pp. 381-384.
Kirovski, et al., "Multimedia Content Screening using a Dual Watermarking and Fingerprinting System", Tech. Rep. MSR-TR-2001-57, Microsoft Research Jun. 2001).
Kocher, P., et al., "Self-Protecting Digital Content: A Technical Report from the CRI Content Security Research Initiative," Cryptography Research, Inc. (CRI), 2002-2003 pp. 1-14
Kutter, et al., "The watermark copy attack", Proc. of the SPIE: Security and Watermarking of Multimedia Content II, vol. 3971, Jan. 2000.
Kuznetsov, A.V. et al., An Error Correcting Scheme for Defective Memory, IEEE Trans. Inf. Theory, vol. 4, No. 6, pp. 712-718 (Nov. 1978) (7 pages).
"Civolution's 2nd screen synchronisation solution wins CSI product of the year 2011 award at IBC," IBC Press Release, Hall 2—Stand C30, Sep. 2011 (2 pages).
"Content Protection—Self Protecting Digital Content," http://www.cryptography.com/technology/spdc/index.html, May 2010 (1 page).
"Red Bee and Civolution develop companion app for FX UK," http://www.digitaltveurope.net/19981/red-bee-and-civolution-develop-companion-app-for-fx-uk, Jan. 2012 (2 pages).
Bangaleea, R., et al., "Performance improvement of spread spectrum spatial-domain watermarking scheme through diversity and attack characterisation," IEEE Africon, pp. 293-298, 2002.
Cappellini, V., et al. "Robust Frame-based Watermarking for Digital Video," Proceedings of the 12th International Workshop on Database and Expert Systems Applications, Sep. 2001 (5 pages).
European Search Report dated Apr. 12, 2012 for European Patent Application No. 07836262.1 filed Jul. 25, 2007 (12 pages).
European Search Report dated Jul. 3, 2012 for European Patent Application No. 12150742.0, filed Oct. 7, 2003 (5 pages).
European Search Report dated Nov. 8, 2012 for European Patent Application No. 06785709.4, filed Jun. 27, 2006 (5 pages).
European Search Report dated Oct. 24, 2012 for European Patent Application No. 06758537.2, filed Apr. 21, 2006 (6 pages).
European Search Report dated Oct. 31, 2012 for European Patent Application No. 06758577.8, filed Apr. 25, 2006 (6 pages).
International Search Report and Written Opinion dated Sep. 12, 2014 for International Application No. PCT/US2014/035474, filed Apr. 25, 2014 (17 pages).
International Search Report and Written Opinion dated Sep. 15, 2014 for International Application No. PCT/US2014/035539, filed Apr. 25, 2014 (16 pages).
International Search Report and Written Opinion dated Apr. 24, 2012 for International Application No. PCT/US2011/051857, filed Sep. 15, 2011 (9 pages).
International Search Report and Written Opinion dated Apr. 8, 2013 for International Application No. PCT/US2012/069306, filed Dec. 12, 2012 (12 pages).
International Search Report and Written Opinion dated Aug. 25, 2014 for International Application No. PCT/US2014/029564, filed Mar. 14, 2014 (10 pages).
International Search Report and Written Opinion dated Aug. 25, 2013 for International Application No. PCT/US2014/026322, filed Aug. 25, 2014 (12 pages).
International Search Report and Written Opinion dated Aug. 8, 2014 for International Application No. PCT/US2014/028372, filed Mar. 14, 2014 (18 pages).

(56) References Cited

OTHER PUBLICATIONS

International Search Report and Written Opinion dated Feb. 28, 2013 for International Application No. PCT/US2012/066138, filed Nov. 20, 2012 (11 pages).
International Search Report and Written Opinion dated Mar. 14, 2013 for International Application No. PCT/US2012/069308, filed Dec. 12, 2012 (10 pages).
International Search Report and Written Opinion dated Mar. 18, 2013 for International Application No. PCT/US2012/063431, filed Nov. 2, 2012 (10 pages).
International Search Report and Written Opinion dated Mar. 25, 2013 for International Application No. PCT/US2012/069302, filed Dec. 12, 2012 (22 pages).
International Search Report and Written Opinion dated Mar. 28, 2012 for International Application No. PCT/US2011/051855, filed Sep. 15, 2011 (8 pages).
Kirovski, D., et al., "Robust spread-spectrum audio watermarking," IEEE International Conference on Acoustics, Speech, and Signal Processing, 3:1345-1348, 2001.
Maehara, F., et al., "A proposal of multimedial home education terminal system based on flash-squeak OS," Technical report of the institute of image information and television engineers, 28(43):21-24, Jul. 2004.
Office Action dated Jan. 20, 2014 for Japanese Patent Application No. 2013-036990 (6 pages).
Office Action dated Jul. 21, 2011 for Japanese Patent Application No. 2008-508985 (6 pages).
Office Action dated Mar. 16, 2012 for Japanese Patent Application No. 2008-508985 (8 pages).
Office Action dated May 1, 2013 for Japanese Patent Application No. 2011-114667 (6 pages).
Office Action dated May 8, 2012 for Japanese Patent Application No. 2009-522802 (4 pages).
Office Action dated Nov. 26, 2012 for Japanese Patent Application No. 2011-114667 (8 pages).
Office Action dated Nov. 28, 2012 for Japanese Patent Application No. 2011-114666 (8 pages).
Seok, J., et al., "A novel audio watermarking algorithm for copyright protection of digital audio," ETRI Journal, 24(3):181-189, Jun. 2002.
Spangler, T., "Social Science," http://www.multichannel.com/content/social-science, Sep. 2011 (5 pages).
Wang, X, et al., "Robust correlation of encrypted attack traffic through stepping stones by manipulation of interpacket delays," Proceedings of the 10th ACM conference on computer communications security, Oct. 27-30, 2003, Washington D.C., USA.
Wolfgang, R., et al., "Perceptual watermarks for digital images and video," Proceedings of the IEEE, 87(7):1108-1126, Jul. 1999.
"ATSC-3.0 Automatic Content Recognition Watermarking Solutions," ATSC Technology Group, Advanced Television Systems Committee, Inc., Jan. 2014 (6 pages).
Baudy, S., et al., "Estimation of geometric distortions in digital watermarking," IEEE International Conference on Watermarking, (2):885-888, Sep. 2002.
European Search Report dated Oct. 14, 2014 for European Patent Application No. 14173053.1, filed Oct. 7, 2003 (5 pages).
European Search Report dated Apr. 23, 2015 for European Patent Application No. 12846172.0, filed Nov. 2, 2012 (8 pages).
European Search Report dated May 28, 2015 for European Patent Application No. 11825990.2, filed Sep. 15, 2011 (6 pages).
European Search Report dated May 29, 2015 for European Patent Application No. 11825992.8 filed Sep. 15, 2011 (6 pages).
International Search Report and Written Opinion dated May 28, 2015 for International Application No. PCT/US2015/020282, filed Mar. 12, 2015 (7 pages).
International Search Report and Written Opinion dated May 1, 2015 for International Application No. PCT/US2014/052973, filed Aug. 27, 2014 (16 pages).
International Search Report and Written Opinion dated Nov. 11, 2014 for International Application No. PCT/US2014/047840, filed Jul. 23, 2014 (15 pages).
International Search Report and Written Opinion dated Feb. 25, 2015 for International Application No. PCT/US2014/041166, filed Jun. 5, 2014 (10 pages).
Miller, M.L. et al. "Computing the probability of false watermark detection," Published in the Proceedings of the Workshop on Information Hiding, Dresden, Germany, Sep. 29-Oct. 1, 1999.
Miller, M.L. et al. "Informed embedding: exploiting image and detector information during watermark insertion," IEEE Conference Publication, Image Processing, (3):1-4, Sep. 2000.
Office Action dated Dec. 29, 2014 for Chinese Patent Application No. 201180051690.8 (14 pages).
Office Action dated Oct. 30, 2014 for Korean Patent Application No. 10-2013-7009718 (8 pages).
Office Action dated Mar. 30, 2015 for Korean Patent Application No. 10-2014-7015220 (19 pages).
Office Action dated Feb. 3, 2015 for Chinese Patent Application No. 201180051678.7 (27 pages).
Wang, H., "Communication-resource-aware adaptive watermarking for multimedia authentication in wireless multimedia sensor networks," J Supercomput, 64:883-897, 2013.

* cited by examiner

CONDITIONAL ACCESS USING EMBEDDED WATERMARKS

FIELD OF INVENTION

The present application generally relates to the field of content management. More particularly, the disclosed embodiments relate to conditionally accessing a marked content that is subject to copy control enforcement policies.

BACKGROUND

This section is intended to provide a background or context to the disclosed embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Digital watermarks have been proposed and used for copyright protection of audio, video, images and other types of media. In a typical watermarking scenario an auxiliary information signal is hidden within a host content in such a way that it is substantially imperceptible, and at the same time, difficult to remove without damaging the host content. In some applications, the auxiliary information that is hidden within the host content is used to provide copy control for the host media content. For example, the detection of an embedded watermark that includes copy control information (CCI) (hereinafter referred to as a CCI watermark) may stop the playback of an unauthorized content.

In other applications, digital watermarks may be used to carry other information, such as the identity of the content itself, the content owner, the distribution channel, the content format, and the like. Typically such information is embedded into the content using watermarks that have a larger payload (hereinafter referred to as an Extended Payload (EP) watermark) than the CCI watermarks. For example, while a watermark payload of 8 bits may suffice for carrying CCI, an extended payload of, for example, 20 to 100 bits may be required to embed non-copy control information. In some applications, EP watermarks may have different performance and reliability requirements than CCI watermarks.

Historically, CCI and EP watermarks have been used for distinct applications and, therefore, have been developed and implemented separately often using distinct watermarking techniques. Independent embedding and extraction of such watermarks can, however, result in unwanted artifacts in the host content and result in additional penalties in terms of watermark robustness and computational complexity of embedding and extraction operations.

SUMMARY

This section is intended to provide a summary of certain exemplary embodiments and is not intended to limit the scope of the embodiments that are disclosed in this application.

Some of the disclosed embodiments enable embedding and extraction of multiple watermark messages in a coordinated fashion to improve watermark transparency, robustness against impairments, security, and computational complexity of embedding and extraction of watermarks. These improved aspects of the watermarking system provide significant value to content owners, content distributors, and consumers at a small incremental cost. The disclosed embodiments further facilitate embedding and extraction of watermarks by maintaining and updating a database to contain associations between the embedded watermarks and metadata related to such watermarks. Moreover, the disclosed embodiments facilitate conditional access to a content embedded with watermarks when copy control rules associated with an embedded watermark message prohibits unconditional access to the content.

One aspect of the disclosed embodiments relates to a method of embedding watermarks into a host content that comprises obtaining a payload of a first watermark message for embedding into the host content, obtaining a payload of a second watermark message for embedding into the host content, and embedding the first and the second watermark messages into the host content in a coordinated fashion such that the embedded first watermark message has a pre-defined relationship with the embedded second watermark message in a particular domain. The embedded symbols of the first watermark message are substantially non-overlapping with embedded symbols of the second watermark message in the particular domain. In one embodiment, the particular domain is at least one of a spatial, temporal and frequency domains.

According to an embodiment, the embedding of the first and the second watermark messages is conducted in a single watermark embedding session, whereas in another embodiment, the embedding of the first watermark message is conducted in a different embedding session than the embedding of the second watermark message. According to another embodiment, different watermarking technologies are used for embedding each of the first and the second watermark messages. In an alternate embodiment, the same watermarking technologies are used for embedding each of the first and the second watermark messages.

In another embodiment, one or more symbols of the second watermark message are embedded into the host content in a multiplexed fashion with one or more symbols of the first watermark messages. For example, the multiplexed fashion comprises multiplexing in at least one of a frequency, time and spatial domains. In still another embodiment, embedding of one or more symbols of the first watermark message is skipped, and a space vacated by skipping the one or more symbols of the first watermark message is used for embedding at least one symbol of the second watermark message.

In one embodiment, the above noted method further comprises performing a single watermark masking operation. In another embodiment, the first watermark message is embedded into a first component of the host content and the second watermark message is embedded into a second component of the host content. In one example, the first component is an audio component and the second component is a video component. In yet another embodiment, the first watermark message is a copy control information watermark and the second watermark message is an extended payload watermark. In another embodiment, embedding the first and the second watermark messages includes the following operations: identifying all embedding opportunities within the host content based on a content perceptual criterion, allocating a first subset of identified embedding opportunities for embedding of the first watermark message, and allocating a second subset of identified embedding opportunities for embedding of the second watermark message.

Another aspect of the disclosed embodiments relates to a method for extracting watermarks that includes extracting a first watermark message from a host content, and obtaining a predefined relationship between symbols of the extracted first watermark message and symbols of a second watermark message in a particular domain. Such a method for extracting watermarks further includes extracting the second watermark message based on the predefined relationship, where embedded symbols of the first watermark message are substantially non-overlapping with embedded symbols of the second watermark message in the particular domain. In one embodiment, the particular domain is at least one of a spatial, temporal and frequency domains.

According to an embodiment, the predefined relationship is a multiplexing relationship between one or more symbols of the first watermark message and one or more symbols of the second watermark message. For instance, the multiplexing can include multiplexing in at least one of a frequency, time and spatial domains. In another embodiment, the first watermark message is extracted from a first component of the host content and the second watermark message is extracted from a second component of the host content. In a particular example, the first component is an audio component and the second component is a video component.

In one embodiment where the second watermark message comprises a time-code, extracting the second watermark message includes extracting the time-code from the second watermark message, determining content timing information from the extracted time code, and determining accuracy of the content timing information. In another embodiment where the second watermark message also comprises a time-code, extracting the second watermark message further includes determining content timing information based on time-codes in a plurality of extracted second watermark messages, determining an error value associated with the content timing information, and setting a new reference timing information if the determined error value is at or below a target error value. In one variation, the time-codes are further used to detect content manipulations.

Another aspect of the disclosed embodiments relates to a device for embedding watermarks, where the device includes a watermark packet generator that is configured to obtain a payload of a first watermark message and a payload of a second watermark message for embedding into a host content. The device also includes a watermark embedder that is configured to embed the first and the second watermark messages into the host content in a coordinated fashion such that the embedded first watermark message has a pre-defined relationship with the embedded second watermark message in a particular domain. Further, the embedded symbols of the first watermark message are substantially non-overlapping with embedded symbols of the second watermark message in the particular domain.

In one example embodiment, the watermark embedder is configured to embed the first and the second watermark messages in a single watermark embedding session, whereas in another example embodiment, the watermark embedder is configured to embed the first and the second watermark messages in different embedding sessions. In yet another embodiment, the watermark embedder is configured to embed one or more symbols of the second watermark message into the host content in a multiplexed fashion with one or more symbols of the first watermark messages. In another example embodiment, the watermark embedder is configured to skip the embedding of one or more symbols of the first watermark message, and use a space vacated by skipping the one or more symbols of the first watermark message for embedding at least one symbol of the second watermark message.

Another aspect of the disclosed embodiments relates to a device that includes a processor and a memory that comprises processor executable code. The processor executable code when executed by the processor configures the device to obtain a payload of a first watermark message for embedding into the host content, obtain a payload of a second watermark message for embedding into the host content, and embed the first and the second watermark messages into the host content in a coordinated fashion such that the embedded first watermark message has a pre-defined relationship with the embedded second watermark message in a particular domain. The embedded symbols of the first watermark message are substantially non-overlapping with embedded symbols of the second watermark message in the particular domain.

Another aspect of the disclosed embodiments relates to a computer program product, embodied on a non-transitory computer readable medium. The computer program product includes program code for obtaining a payload of a first watermark message for embedding into the host content, program code for obtaining a payload of a second watermark message for embedding into the host content, and program code for embedding the first and the second watermark messages into the host content in a coordinated fashion such that the embedded first watermark message has a pre-defined relationship with the embedded second watermark message in a particular domain. The embedded symbols of the first watermark message are substantially non-overlapping with embedded symbols of the second watermark message in the particular domain.

Another aspect of the disclosed embodiments relates to a device that includes a watermark extractor that is configured to extract a first watermark message from a host content, and a data processing component that is configured to obtain a predefined relationship between the symbols of the extracted first watermark message and symbols of a second watermark message in a particular domain. The watermark extractor is further configured to extract the second watermark message based on the predefined relationship, where the embedded symbols of the first watermark message are substantially non-overlapping with embedded symbols of the second watermark message in the particular domain.

In one embodiment where the second watermark message comprises a time-code, the watermark extractor is configured to extract the second watermark message, at least in-part, by extracting the time-code from the second watermark message, determining content timing information from the extracted time code, and determining accuracy of the content timing information. In another exemplary embodiment where the second watermark message comprises a time-code, the watermark extractor is configured to extract the second watermark message, at least in-part, by determining content timing information based on time-codes in a plurality of extracted second watermark messages, determining an error value associated with the content timing information, and setting a new reference timing information if the determined error value is at or below a target error value. In yet another exemplary embodiment, the watermark extractor is further configured to use the time-code to detect content manipulations.

Another aspect of the disclosed embodiments relates to a non-transitory computer-readable storage medium with a host content embodied thereupon. The host content comprises one or more watermarks that are imperceptibly embedded in the host content, wherein reception of the host content by a content handling device equipped with a watermark extractor triggers the watermark extractor to extract a first watermark message from the host content, obtain a predefined relationship between symbols of the extracted first watermark message and symbols of a second watermark message in a particular domain, and extract the second watermark message based on the predefined relationship. The embedded symbols of the first watermark message are substantially non-overlapping with embedded symbols of the second watermark message in the particular domain.

Another aspect of the disclosed embodiments relates to a device that includes a processor and a memory. The memory comprise processor executable code such that the processor executable code when executed by the processor configures the device to extract a first watermark message from a host content, obtain a predefined relationship between symbols of the extracted first watermark message and symbols of a second watermark message in a particular domain, and extract the second watermark message based on the predefined relationship. The embedded symbols of the first watermark message are substantially non-overlapping with embedded symbols of the second watermark message in the particular domain.

Another aspect of the disclosed embodiments relates to a computer program product, embodied on a non-transitory computer readable medium. The computer program product includes program code for extracting a first watermark message from a host content, program code for obtaining a predefined relationship between symbols of the extracted first watermark message and symbols of a second watermark message in a particular domain, and program code for extracting the second watermark message based on the predefined relationship. The embedded symbols of the first watermark message are substantially non-overlapping with embedded symbols of the second watermark message in the particular domain.

Another aspect of the disclosed embodiments relates to a method that includes embedding a watermark into a host content, where at least a portion of payload of the embedded watermark is generated automatically by a watermark embedder. This method further comprises updating a database to contain an association between the automatically generated portion of the payload and metadata, where the metadata includes one or more identifiers of the host content. By the way of example, and not by limitation, these identifiers can include an International Standard Audiovisual Number (ISAN), a stock keeping unit (SKU), a Uniform Recourse Identifier (URI), a Universal Product Code (UPC), an Advanced Television Systems Committee (ATSC) content identifier, and/or other identifiers in either standard or proprietary numbering systems, as well as descriptive information about the content such as original name, release year, producer, director, cast, genre, story and the like.

In one embodiment, updating the database includes obtaining a copy of the embedded host content after the embedded host content has been publicly distributed, extracting the embedded watermarks, determining the automatically generated portion of the payload from the extracted watermarks, and associating the determined value of the automatically generated portion of the payload with the one or more identifiers of the host content. In another exemplary embodiment, updating the database comprises manually associating the automatically generated portion of the payload with the one or more identifiers of the host content.

According to one embodiment, updating the database comprises obtaining association information between the automatically generated portion of the payload and at least one content identifier that resides at a second database. In one example, information indicative of the association is produced during embedding of the watermark. In another example, information indicative of the association is produced during a watermark verification operation, where the watermark verification operation comprises examining the host content to determine a presence and a value of the embedded watermark.

In another embodiment, updating the database comprises associating the automatically generated portion of the payload with the corresponding metadata that reside at the database and using the corresponding metadata to identify the one or more identifiers of the host content. In yet another embodiment, the above noted method further includes associating the automatically generated portion of the payload with the one or more identifiers of the host content as part of watermark embedding operation, storing the association in an embedder log, and uploading the embedder log information to the database. In one embodiment, the automatically generated portion of the payload is a serial number that is changed for each watermark embedding session.

Another aspect of the disclosed embodiments relates to a device that includes a watermark embedder that is configured to embed a watermark into a host content, the watermark embedder is further configured to generate at least a portion of payload of the embedded watermark automatically. Such a device also includes a communication component configured to communicate updates to a database such that the database contains an association between the automatically generated portion of the payload and metadata, where the metadata includes one or more identifiers of the host content.

In one embodiment, the watermark embedder is configured to associate the automatically generated portion of the payload with the one or more identifiers of the host content and store the association in an embedder log, and the communication component is configured to upload the embedder log information to the database.

Another aspect of the disclosed embodiments relates to a device that includes a processor and a memory that comprises processor executable code. The processor executable code, when executed by the processor, configures the device to embed a watermark into a host content, where the device is further configured to automatically generate at least a portion of payload of the embedded watermark is generated. The processor executable code, when executed by the processor, further configures the device to update a database to contain an association between the automatically generated portion of the payload and metadata at the database, where the metadata includes one or more identifiers of the host content.

Another aspect of the disclosed embodiments relates to a computer program product, embodied on a non-transitory computer readable medium. The computer program product comprises program code for embedding a watermark into a host content, where at least a portion of payload of the embedded watermark is generated automatically by a watermark embedder. The computer program product also includes program code for updating a database to contain an association between the automatically generated portion of the payload and metadata at the database, where the metadata comprising one or more identifiers of the host content.

Another aspect of the disclosed embodiments relates to a method that includes extracting an embedded first watermark message from a content, where the embedded first watermark message is a copy control watermark and copy control rules associated with the extracted first watermark message prohibits unconditional access to the content. This method further includes extracting an embedded second watermark from the content, based on the extracted second watermark message, determining whether or not an exception to the copy control rules exists, and if an exception to the copy control rules exists, and enabling conditional access to the content. The method also includes extracting additional watermark messages while the content is being conditionally accessed, and based on the additionally extracted watermark messages, verifying that conditional access to the content has been fulfilled.

In one embodiment, each of the extracted second watermark message and the additionally extracted watermark messages comprises a time-code. In this embodiment, verifying that the conditional access has been fulfilled includes determining if substantially all time-codes associated conditionally accessible portions of the content have been extracted.

In another embodiment, each of the extracted second watermark message and the additionally extracted watermark messages comprises a time-code. In this embodiment, the exception to the copy control rules comprises allowing access to the content in exchange for viewing of an advertisement that is played back simultaneously with the content during a specific time interval as determined by the time-codes of the extracted second watermark message and the additionally extracted watermark messages. In one example, the advertisement is selected based on the subject matter of the content during the specific time interval.

According to another embodiment, conditional access to the content is determined based on elapsed time from public release of the content. In another embodiment where an exception to the copy control rules does not exist, an alternative to accessing the content is offered to a user. For example, such an alternative can include at least one of: directing the user to a web site where a version of the content can be obtained, informing the user of content show times at one or more movie theatres, a recommendation of similar content and a date on which the content becomes available for sale or rent.

In another embodiment, determining whether or not an exception to the copy control rules exists includes obtaining an identification value associated with the extracted second watermark message, and obtaining information indicative of available exceptions to the copy control rules from a database that comprises metadata associated with the identification value. In one example, the metadata is further used to carry out at least one of: accessing additional information about the content using the Internet, playing games, interacting with other consumers of the content using a social network and purchasing merchandise related to the content.

Another aspect of the disclosed embodiments relates to a device that includes a watermark extractor that is configured to extract an embedded first watermark message from a content, where the embedded first watermark message is a copy control watermark and copy control rules associated with the extracted first watermark message prohibits unconditional access to the content. The watermark extractor further configured to extract an embedded second watermark from the content, and if an exception to the copy control rules exists, enable conditional access to the content. The watermark extractor is also configured to extract additional watermark messages while the content is being conditionally accessed, and based on the additionally extracted watermark messages, verify that conditional access to the content has been fulfilled. This device also includes a watermark assessment component that is configured to determine, based on the extracted second watermark message, whether or not an exception to the copy control rules exists.

In one embodiment where each of the extracted second watermark message and the additionally extracted watermark messages comprises a time-code, the watermark extractor is configured to verify that the conditional access has been fulfilled by, at least in-part, determining if substantially all time-codes associated conditionally accessible portions of the content have been extracted.

In another embodiment where each of the extracted second watermark message and the additionally extracted watermark messages comprises a time-code, the exception to the copy control rules comprises allowing access to the content in exchange for viewing of an advertisement that is played back simultaneously with the content during a specific time interval as determined by the time-codes of the extracted second watermark message and the additionally extracted watermark messages.

In one embodiment, the watermark extractor is configured to determine whether or not an exception to the copy control rules exists by, at least in-part, obtaining an identification value associated with the extracted second watermark message, and obtaining information indicative of available exceptions to the copy control rules from a database that comprises metadata associated with the identification value.

Another aspect of the disclosed embodiments relates to a non-transitory computer-readable storage medium with a content embodied thereupon. The content comprises one or more watermarks that are imperceptibly embedded in the content. The reception of the content by a content handling device equipped with a watermark extractor triggers the watermark extractor to extract an embedded first watermark message from a content, where the embedded first watermark message is a copy control watermark and copy control rules associated with the extracted first watermark message prohibits unconditional access to the content. The watermark extractor is further triggered to extract an embedded second watermark from the content, then based on the extracted second watermark message, determine whether or not an exception to the copy control rules exists, and if an exception to the copy control rules exists, enable conditional access to the content. The watermark extractor is also triggered to extract additional watermark messages while the content is being conditionally accessed, and based on the additionally extracted watermark messages, verify that conditional access to the content has been fulfilled.

Another aspect of the disclosed embodiments relates to a device that includes a processor and a memory that comprises processor executable code. The processor executable code, when executed by the processor, configures the device to extract an embedded first watermark message from a content, where the embedded first watermark message is a copy control watermark and copy control rules associated with the extracted first watermark message prohibits unconditional access to the content. The processor executable code, when executed by the processor, also configures the device to extract an embedded second watermark from the content, then based on the extracted second watermark message, determine whether or not an exception to the copy control rules exists, and if an exception to the copy control rules exists, enable conditional access to the content. The processor executable code, when executed by the processor, further configures the device to extract additional watermark messages while the content is being conditionally accessed, and based on the additionally extracted watermark messages, verify that conditional access to the content has been fulfilled.

Another aspect of the disclosed embodiments relates to computer program product, embodied on a non-transitory computer readable medium. The computer program product includes program code for extracting an embedded first watermark message from a content, where the embedded first watermark message is a copy control watermark and copy control rules associated with the extracted first watermark message prohibits unconditional access to the content. The computer program product also includes program code for extracting an embedded second watermark from the content, program code for, based on the extracted second watermark message, determining whether or not an exception to the copy control rules exists, and if an exception to the copy control rules exists, program code for enabling conditional access to the content. The computer program produce further includes program code for extracting additional watermark messages while the content is being conditionally accessed, and program code for, based on the additionally extracted watermark messages, verifying that conditional access to the content has been fulfilled.

These and other advantages and features of disclosed embodiments, together with the organization and manner of operation thereof, will become apparent from the following detailed description when taken in conjunction with the accompanying drawings.

DETAILED DESCRIPTION OF CERTAIN EMBODIMENTS

Figure 1:
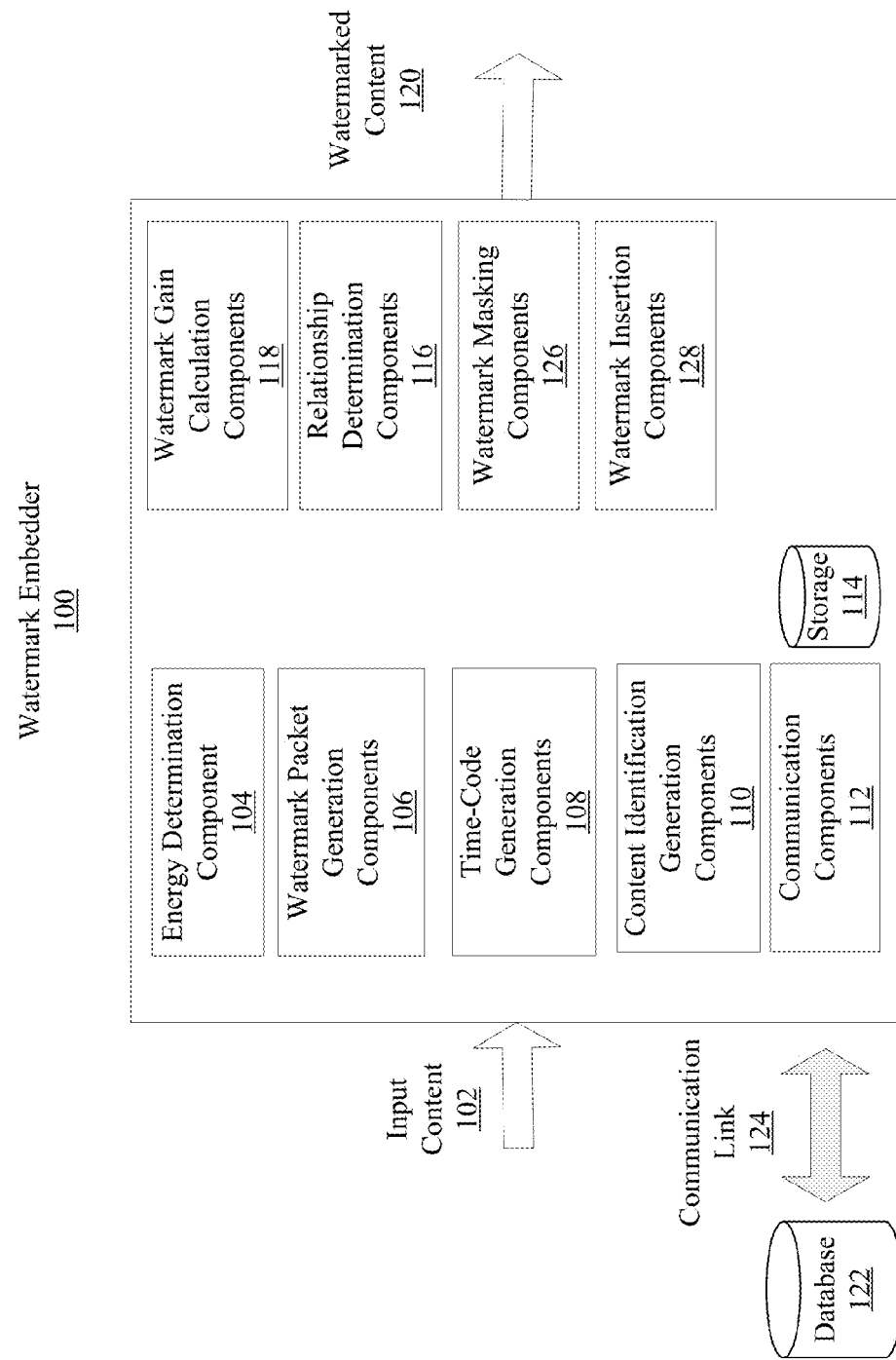
FIG. 1 is a block diagram of a watermark embedder in accordance with an exemplary embodiment.

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner. It should be further noted that to facilitate the understanding of the disclosed principals, copy control information (CCI) and extended payload (EP) watermarks are used as exemplary watermark messages. It is, however, understood that the disclosed embodiments are equally applicable to other watermark messages than can be embedded and extracted from multimedia content.

As noted earlier, CCI watermarks traditionally use a small payload to convey copy control information. For example, CCI watermarks can communicate several of a handful of copy management states that include "Copy Once," "No More Copies," "No Home Use," "Trusted Source" and/or other similar states that can be encoded using relatively few bits of information. CCI watermarks typically require a very low false positive detection rate, such as one false detection per 100,000 years of continuous playback of content. Furthermore, CCI watermarks must be designed to provide certain level of immunity against intentional and/or unintentional removal attempts. Such attempts can, for example, include perceptual compression of a content, analog capture and various signal processing operations. Since copy control operations typically occur in consumer devices, CCI watermark extractors must be designed to operate with computational efficiency and low memory and/or footprint configurations. Another consideration for designing CCI watermarks relates to the transparency of embedded watermarks. In typical copy control watermarking applications, it is important that the CCI watermarks are substantially imperceptible when embedded in premium content, such as movies, music, images, and the like.

CCI watermarks are typically embedded redundantly (i.e., repeatedly embedded with the same payloads) throughout a content. This way, the likelihood of successful watermark detection increases even if the content is attacked by, for example, breaking it up into multiple segments. In the so-called mosaic attack, the content is broken up by an attacker and presented to the watermark extractor as multiple segments or files in an attempt to prevent the detection of watermarks. At the output of the watermark extractor, the content is then reassembled for consumption by the users. The redundant embedding of CCI watermarks provides additional benefits when the content is accessed and consumed sequentially. In such a scenario, the copy control policy associated with the CCI watermarks can be enforced upon the detection of a single (or an adequate number of) CCI watermarks, well before the entire content is presented. Furthermore, the redundant embedding of CCI watermarks can be used to improve watermark robustness against additional noise and other impairments that are due to unintentional and/or intentional content processing operations.

Other watermark messages, such as messages that are conveyed using EP watermarks, may require a different set of performance and reliability characteristics. In particular, an EP watermark that is used for content identification may require a false positive detection rate, robustness to standard signal processing operations, immunity against intentional attempts to forge or remove the watermarks, computational complexity of embedding and/or extraction and transparency (i.e. perceptibility) that are different from those required for a CCI watermark. As noted earlier, an EP watermark may be used for different purposes including, but not limited to, identifying one or more of the following: the content itself, the content owner, the distribution channel(s) of the content, the content format, additional features associated with the content, the recipient of the content, a transaction associated with the content, the device that receives, plays or processes the content, a domain or an account which a content belongs to, an entity, such as a person or organization, which owns certain rights associated with the content, and the like. EP watermarks may further include additional commands that control other device or trigger actions of devices, provide content integrity verification, detect content manipulation, or provide auxiliary information for interaction with devices and users.

The differences between performance requirements and intended applications of EP and CCI watermarks have traditionally led to the development and optimization of disparate watermarking technologies for embedding multimedia content with a particular type of watermark. As a result, when multiple watermark messages, such as CCI, EP and other types, are needed to be embedded within a content, these watermarks have been traditionally embedded independently from one another.

The disclosed embodiments provide improvements in watermark transparency, robustness, security, computational complexity of embedding and extraction of watermarks when multiple watermark messages are embedded within the same content. These and other improvements are achieved by coordinating the embedding and/or extraction of different watermarks messages within a content. In some embodiments, coordination of the embedding and extraction of different watermark messages is accomplished by maintaining predefined relationships between the payloads of various watermarks in time, space, frequency and/or other domains. For example, the predefined relationships may be achieved by coordinating the selection of watermark embedding parameters associated with different watermark messages. Such watermark embedding parameters can include, but are not limited to, the media type, payload scrambling or encryption keys, watermark temporal, spatial, and/or band of frequency locations within the content, type of embedding algorithm, frequency and/or phase shift associated with the embedding algorithm, pseudorandom sequence (e.g., in spread-spectrum watermarking systems), and the like.

FIG. 1 is a block diagram of an exemplary watermark embedder 100 that can be implemented in accordance with the disclosed embodiments. The input content 102 may be communicated to the watermark embedder 100 through one or more communication channels comprising wired and/or wireless communication channels, magnetic, optical, Flash and/or other computer readable media, or other sources. The watermark embedder 100 may also be capable of connecting to external entities and networks, such as the Internet. A watermarked content 120 is generated at the output of the watermark embedder 100.

FIG. 1 illustrates certain components within the watermark embedder 100 that can be configured to carry out various coordinated embedding operations in accordance with the disclosed embodiments. It should be noted, however, that the simplified diagram of FIG. 1 is not intended to provide an exhaustive depiction of every component within the watermark embedder 100 and, therefore, additional or fewer components may reside within the watermark embedder 100. Further, while FIG. 1 shows individual components that are configured to carry out specific operations, it is understood that such a depiction is merely provided to facilitate the understanding of the disclosed embodiments. As such, one or more components of the watermark embedder 100 may be combined with other components of the watermark embedder 100. Further, some of the operations necessary for carrying out the embedding operations may be conducted outside of the watermark embedder 100. It should be further noted that the components within the watermark embedder 100 may be implemented in hardware, software and/or combinations thereof. In some embodiments, some or all of the components of the watermark embedder 100 are implemented using one or more processors that execute a program code that resides on a computer readable medium.

The watermark embedder 100 of FIG. 1 can include energy determination components 104 that are configured to determine the energy associated with a watermark signal. The watermark embedder 100 can also include watermark packet generation components 106 that are configured to generate watermark packets. Watermark packet generation can include operations such as assembling of watermark bits, insertion of synchronization headers, addition of error correction codes, scrambling, encryption and the like. The watermark packet generation components 106 (which can be part of a packet generator) may reside inside or outside of the watermark embedder 100. In general, various components that are shown in FIG. 1 as part of the watermark embedder 100 may reside outside of the watermark embedder 100. In such a scenario, the various components that reside outside of the watermark embedder 100 are in communication with the watermark embedder 100 to send and/or receive data, control, synchronization and other information to and/or from the watermark embedder 100 or one or more components therein.

The watermark embedder 100 can further include time-code generation components 108 and content identification generation components 110 that are responsible for generating time-codes, content ID, serial numbers, and other information that can be formed as part of the payload of watermarks. FIG. 1 also includes relationship determination components 116 that can be configured to produce and/or retrieve particular relationships between the watermark messages to be embedded. FIG. 1 also illustrates watermark gain calculation components 118 and watermark masking components 126 that, in some embodiments, are responsible for computing watermark gain values and performing watermarking masking operations, respectively. The watermark embedder 100 of FIG. 1 can also include watermark insertion components 128 that are responsible for inserting watermarks signals into the host content. The insertion of watermark signals can be carried out by, for example, adding, multiplying, replacing, merging, or otherwise combining watermark values with the host content values. The operations of these and other components of the watermark embedder 100 will be described in further detail in the sections that follow. It should be noted that the watermark embedder 100 may comprise fewer components or additional components that are not shown in FIG. 1.

Referring back to FIG. 1, the watermark embedder 100 also includes a communication component 112 that enables the watermark embedder 100 to communicate with other entities and components, such as the database 122, through the communication link 124. The database 122 can, for example, include metadata associated with a particular content. In some embodiments, the communications between the watermark embedder 100 and the database 122 can include communicating updates to the database 122. These updates can include particular values, such as serial numbers, identification codes, embedder logs, watermark association information, and the like.

FIG. 1 also illustrates one or more storage units 114 that can reside within the watermark embedder 100. Such storage units 114 can store the input content 102 (e.g., in encrypted, partially encrypted or clear format), the output watermarked content 120, meta data, embedder logs, information that describes predefined relationships between multiple watermark messages, well as computer program code that can be retrieved in order to implement any one of the functionalities of the disclosed embodiments. As such, the storage unit 114 can be in communication with various components of the watermark embedder 100. These components can retrieve and utilize the information, the program codes and the content that are stored on the storage units 114.

The watermark embedders that operate in accordance with the disclosed embodiments can utilize the same or different types of watermarking technologies for embedding multiple watermark messages. In some embodiments, CCI and EP watermarks are embedded in two or more separate embedding operations, regardless of whether or not the same watermarking technology is used. Compared to a single embedding operation, multiple embeddings of watermarks (sometimes also referred to as embedding of multiple watermark layers) can introduce additional perceptual artifacts that negatively impact the transparency of the embedded watermarks within the host content. According to some embodiments, the perceptual impact associated with embedding of multiple watermark messages is reduced by utilizing coordinated embedding techniques that generate both CCI and EP watermark bits according to the same watermarking algorithm, but with a distinct stego key that allows for orthogonal (i.e., mutually non-interfering) embedding of watermarks. Stego key can, for example, include parameters that are associated with the watermarking technology such as particular autocorrelation delay values, frequency shifts, and the like. In one example, after a set of embedding locations are identified, CCI watermarks are embedded into the first subset of these locations and the EP watermarks are embedded in the second subset of these locations which is exclusive from the first subset. In some examples, the adverse impact on the transparency of watermarks due to the presence of multiple layers is mitigated by maintaining the total watermarking energy associated with all layers the same as the watermarking energy associated with a single watermark layer. In some embodiments, the perceptual impact associated with embedding of multiple watermark message is reduced by utilizing one or more coordinated embedding techniques which embeds watermarks in domains that are mutually orthogonal.

Figure 2:
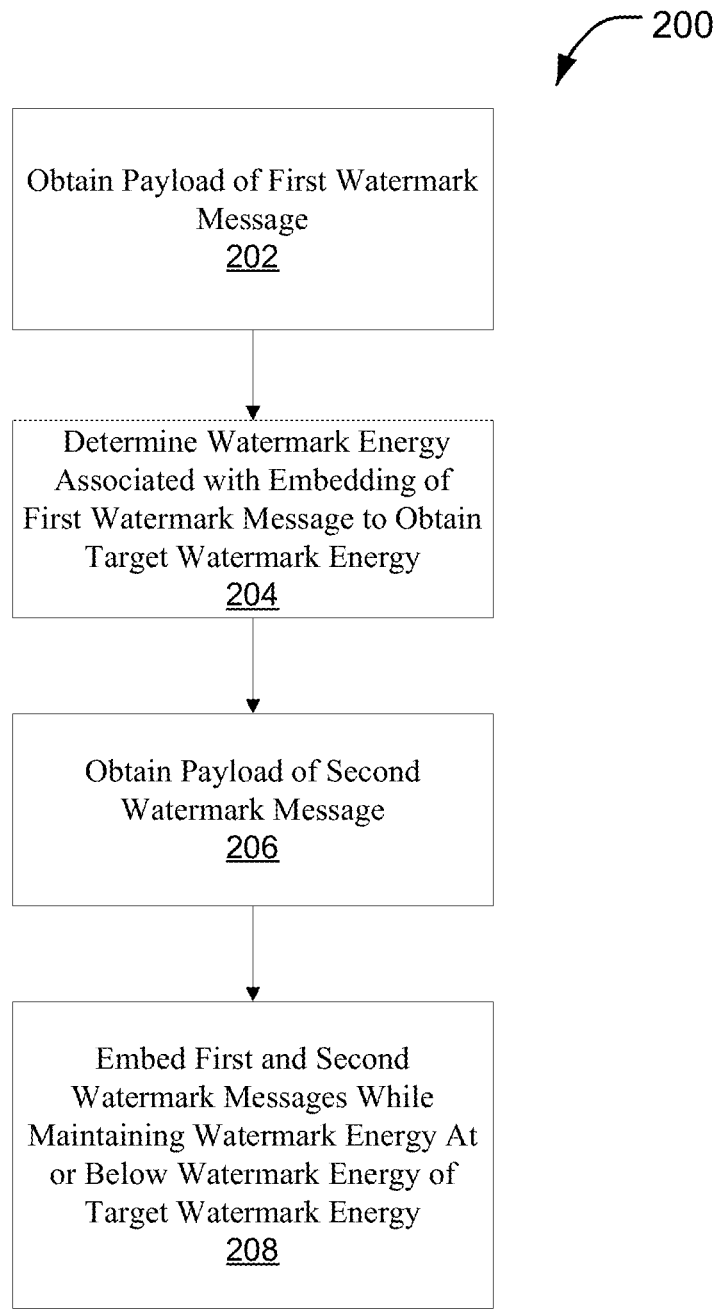
FIG. 2 is a set of operations for embedding watermarks in a content in accordance with an exemplary embodiment.

FIG. 2 illustrates a set of operations 200 that can be carried out to effect coordinated embedding of multiple watermark messages in accordance with an exemplary embodiment. At 202, the payload of the first watermark message is obtained. The operations at 202 can include obtaining a particular bit pattern that represents a watermark state, such as a particular copy control state, in addition to obtaining error control bits, channel coding bits, synchronization bits, etc., that can be formed into a watermark packet. Such a packet of bits may further be subject to scrambling, interleaving, encryption and other operations that are carried out on the packet bits prior to the embedding of the bits into a host content.

At 204, the energy associated with the embedding of the first watermark message is obtained. In one example, the energy is computed as the square value of the difference between content samples with watermark and content samples without watermarks. The operations at 204 can, therefore, include computing a watermark signal associated with watermark packet bits of step 202 as embedded into host content according to a particular watermarking algorithm. Once such a watermark signal is determined, the energy associated with the watermark signal can be determined by, for example, computing a square value of the watermark signal. The determination in step 202 can be conducted for the entire content or for particular segments of the content (e.g., on a segment-by-segment basis). The watermarking energy that is determined at 204 can provide a target watermarking energy for subsequent embeddings of additional watermark messages.

Referring back to FIG. 2, at 206, of the payload of the second watermark message is obtained. The payload can, for example, convey information such as serial numbers, identification information, time-codes and the like. Similar packet forming operations that were described in connection with step 202 may be performed. However, since the first and the second watermark messages are likely to have different robustness, security and false positive detection rate requirements, the generation of bits at step 206 may require fewer or additional error correction, scrambling and encryption operations.

At 208, the bits of the first and the second watermark messages are embedded while maintaining the total watermarking energy below the target energy. To create non-interfering watermarking layers, the embedding of the first and the second watermark messages at 208 may be carried out in accordance with different embedding parameters. The operations at 208 ensure that the embedding of different watermark messages is conducted by maintaining an appropriate level of transparency.

While embedding of multiple layers according to the above noted exemplary embodiment maintains a desirable level of watermark transparency, it may adversely affect the robustness of embedded watermarks due to the reduced energy associated with each watermark message. In some cases, such as embedding of CCI watermarks in audiovisual content, the number of individual marks can be very large. For example, hundreds or even thousands of CCI watermarks can coexist in the same host content. Not all of these watermarks are essential for fulfilling the associated copy control objective. In some embodiments, some of the potential CCI-watermark embedding opportunities are skipped without producing a significant negative impact on the overall performance of the CCI watermarks. In these embodiments, the watermarking space vacated by skipping a fraction of CCI watermarks can be used, instead, for embedding one or more EP watermark bits, with no impact on transparency of embedded watermarks.

Figure 3:
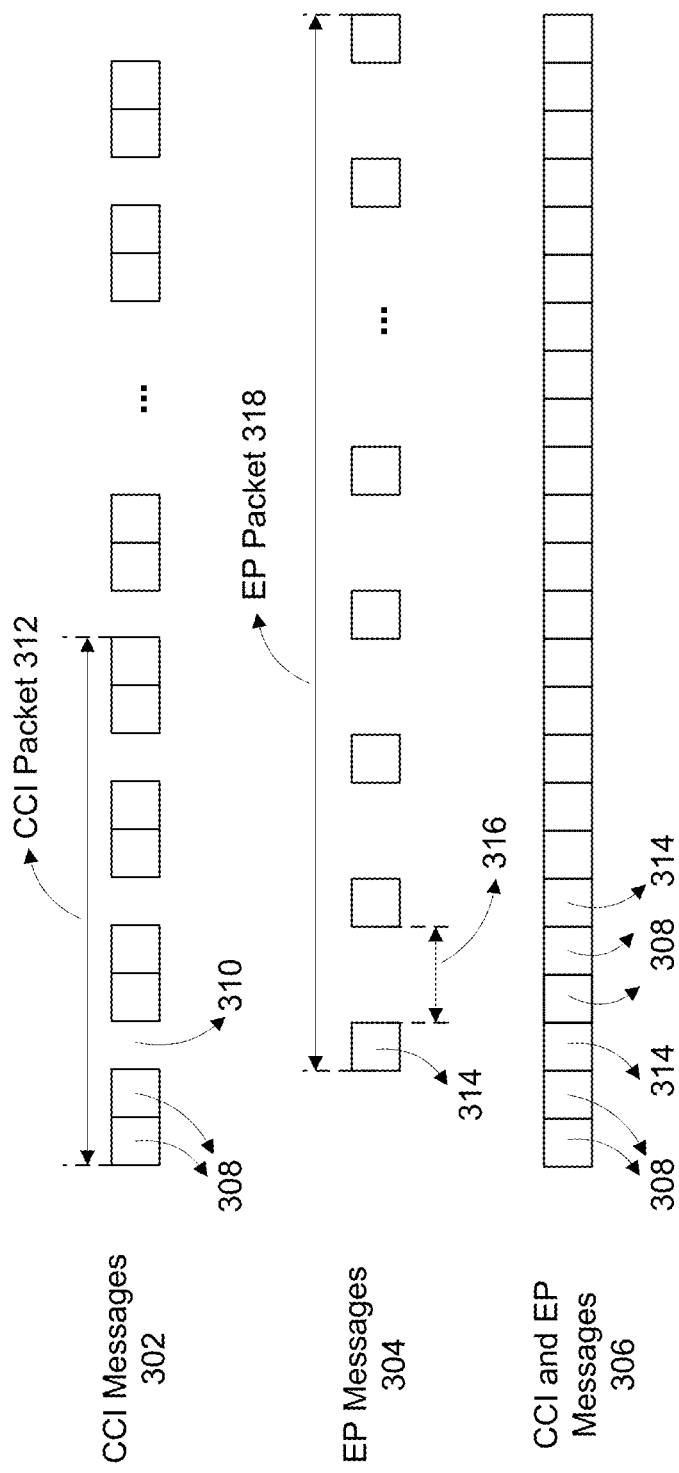
FIG. 3 is a simplified diagram of embedding multiple watermarks in a coordinated fashion in accordance with an exemplary embodiment.

In accordance with some embodiments, different watermark messages are embedded within the same content in a time, space and/or frequency-multiplexed fashion. FIG. 3 provides a simplified illustration of coordinated watermark embedding in accordance with an example embodiment. The simplified diagram of FIG. 3 illustrates the embedding of two different messages, namely CCI messages 302 and EP messages 304 in a host content (not shown) that can be carried out in a particular domain, such as a time, a spatial or frequency domain. Each CCI packet 312 includes one or more CCI symbols 308 that are embedded at particular embedding opportunities within the host content. It should be noted that a "symbol" can be binary or non-binary valued. The CCI symbols 308 can include a bit pattern that represents a watermark state, such as a particular copy control state, error control bits, channel coding bits, synchronization bits and the like. In the exemplary diagram of FIG. 3, each CCI packet 312 (which corresponds to single CCI message) includes eight CCI symbols 308. It is understood, however, that the CCI packet 312 can include additional or fewer symbols 308. According to the exemplary diagram of FIG. 3, the embedding of two CCI symbols 308 in consecutive embedding opportunities within the host content is followed by a CCI gap 310, where no CCI symbols 308 are embedded. The CCI gap 310 is followed by two additional CCI symbols 308, followed by another CCI gap 310 and so on. The CCI gap 310 is illustrated in FIG. 3 as spanning one CCI symbol 308 but it is understood that the CCI gap 310 can have a different extent than a single CCI symbol 308. CCI packets 312 are typically embedded repeatedly throughout the host content.

FIG. 3 also illustrates the embedding of EP messages 304 within the host content in the same domain as the CCI messages. Each EP packet 318 includes a number of EP symbols 314 that are embedded at embedding opportunities that correspond to CCI gaps 310 in the host content. The embedding of each EP symbol 314 in FIG. 3 is followed by an EP gap 316, where the latter coincides with the embedding opportunities associated with two consecutive CCI symbols 308. Each EP packet (which corresponds to a single EP message) can include a large number of symbols that are used to convey identification information, serial numbers, time stamps and the like. EP packets 318 can also be embedded repeatedly throughout the host content. Once both watermark messages are embedded, the host content includes CCI and EP messages 306 that have been embedded in a coordinated fashion.

As illustrated in FIG. 3, the CCI symbols 308 and the EP symbols 314 of FIG. 3 are embedded in substantially non-overlapping embedding opportunities within the host content in the particular embedding domain (e.g., time, spatial or frequency domain). It is understood that adjacent symbols that are embedded into a host content (whether part of the same watermark messages or different watermark messages) may include some overlap region. Such an overlap region between adjacent symbols is typically small compared to the extent of the watermark symbol and can be used to, for example, ensure that a transition between the two symbols does not introduce perceptible artifacts into the host content. FIG. 3 also illustrates that, after embedding of the CCI messages 302 and the EP messages 304, all embedding opportunities within the host content are occupied by either the CCI symbols 308 or the EP symbols 314. In some embodiments, one or more embedding opportunities (or portions thereof) may remain vacant. Such vacancies can be created by, for example, setting a CCI gap 310 extent that is larger than the extent of the EP symbol 314. Alternatively, or additionally, the EP gap 316 extent can be selected to be larger than the extent of two CCI symbols 308. In some embodiments, the created vacancies can be used for embedding of yet another (e.g., a third) watermark message symbols. It should be noted that the above noted vacancies are created by design (i.e., they constitute part of the pre-defined relationship between the two embedded watermarks) and are, therefore, different from un-embedded portions of a host content that may be obtained due to an inability of the content to support embedding of watermarks (e.g., due to watermark imperceptibility concerns).

It should be further noted that the simplified diagram of FIG. 3 illustrates the embedding of two CCI symbols 308 for every EP symbol 314 (i.e., a ratio of 2-to-1). However, in some embodiments, the CCI and EP symbols may be embedded using a different CCI-to-EP symbol ratio. Such a ratio constitutes a portion of the predefined relationship between the multiple watermark messages that are embedded in a coordinated fashion. In one example, a ratio of 1-to-1 of CCI-to-EP symbols is used for embedding CCI messages 302 and EP messages 304 in a coordinated fashion. In another example, a ratio of 8-to-8 is used. In this example, the embedding of 8 CCI symbols 308 (e.g., one CCI packet 312) is followed by the embedding of 8 EP symbols 314. In yet another example, the ratio of CCI-to-EP symbols may be selected to be less than 1 (e.g., 1-to-2).

In one experiment that was conducted in accordance with the disclosed embodiments, CCI and EP watermarks were embedded with a symbol ratio of 1-to-1 in time-multiplexed fashion within an audio content. The results obtained from the analysis of a 30-minute audio content with additive white Gaussian noise illustrate a robustness penalty of about 0.56 dB. On the other hand, the results obtained from the analysis of same audio content that is embedded with multiple layers of CCI and EP watermarks with a 50/50 split in watermark energy illustrate a robustness penalty of about 3.69 dB. These results demonstrate the advantage of time-division multiplexing over layering of different of watermarks. Further, the robustness penalty associated with time-division multiplexing decreases as the content during increases, while the penalty associated with layering of watermarks remains about the same.

In some embodiments, all embedding opportunities within a content are first identified based on a particular perceptual criterion. For example, one perceptual criterion may require an extremely high transparency of watermarks for a content that is released for theatrical release. In contrast, another perceptual criterion that is targeted for content distributed over the Internet, rather than requiring absolute transparency, may require the watermarks to be unobjectionable to a casual viewer. Once the embedding opportunities are identified in view of the perceptual criterion, the identified embedding opportunities may be divided among the various watermark types. In other embodiment, the identification of the embedding opportunities may be carried out in view of other criteria, such as computational complexity of watermark extraction, security (i.e., how well particular watermarks can be detected and/or manipulated by unauthorized parties), reliability (e.g., false positive rate) of watermark detection, and the like.

Once the embedding opportunities are identified, the division of embedding opportunities amongst different watermark messages may be based on achieving a one or more of the following: desired security, transparency computational complexity, reliability of watermark detections, content duration, size of watermark payload, application (i.e., usage) of watermarks and other factors. For example, if the detection of CCI messages with high reliability is important, a high CCI-to-EP symbol ratio may be used. In another example, where the detection of content serial numbers is important, a low CCI-to-EP symbol ratio (even a ratio of less than 1) may be used.

According to the disclosed embodiments, embedding of multiple watermark messages can be carried out in a coordinated way, in either a single embedding session or in separate sessions. When multiple watermark messages are embedded in separate sessions at various points during content production, delivery, archive and consumption, additional knowledge is required to be shared among these separate embedding sessions to achieve the same results as if they were embedded in a single embedding session. Such knowledge is often obtained in earlier sessions and passed to the later sessions of embedding.

Alternatively, or additionally, each embedding session may use a predefined template of embedding locations (e.g., in time, space and/or frequency domain) that endures a desired relationship between different payloads. The integrity of the content between separate embeddings must be maintained, at least to some extent, in order to achieve the desired relationship between payloads of the embedded watermarks. In one example embodiment that involves embedding the different watermark messages in different embedding sessions, the first watermark message (e.g., CCI bits) are embedded in a first watermarking session, leaving gaps (e.g., time gaps, space gaps, etc,) within the host content where the second watermark message (e.g., the EP watermark bits) can be embedded. In this example embodiment, during the second embedding session, the symbols (e.g., bits) of the second watermark message are embedded in some or all of the gaps that were not embedded during the first embedding session. In some examples, certain pre-processing operations, such as modification of the host content to effect masking, are carried out only once during one of the embedding sessions. For example, a masking operation may be carried out only during the first embedding session. In some examples, the first and second watermark messages are embedded at the same locations in two separate sessions in such a way that the level of modifications (e.g. watermark energies) introduced by each watermark message is predefined in value or proportion.

In some embodiments, the host content that is produced in a single-session embedding is identical to the host content that is produced in a multi-session embedding operation. In another embodiment, the host content that is produced in a single-session embedding is not identical to the host content that is produced in a multi-session embedding operation. For example, in a two-session embedding, if masking operations are carried out during each of the embedding sessions, the resulting host content would not be identical to the host content that is produced in a single-embedding session that uses a single masking operation. In this example, however, the embedded host content that is generated pursuant to a multi-session embedding is substantially similar to the host content that is generated pursuant to a single-session embedding.

Figure 4:
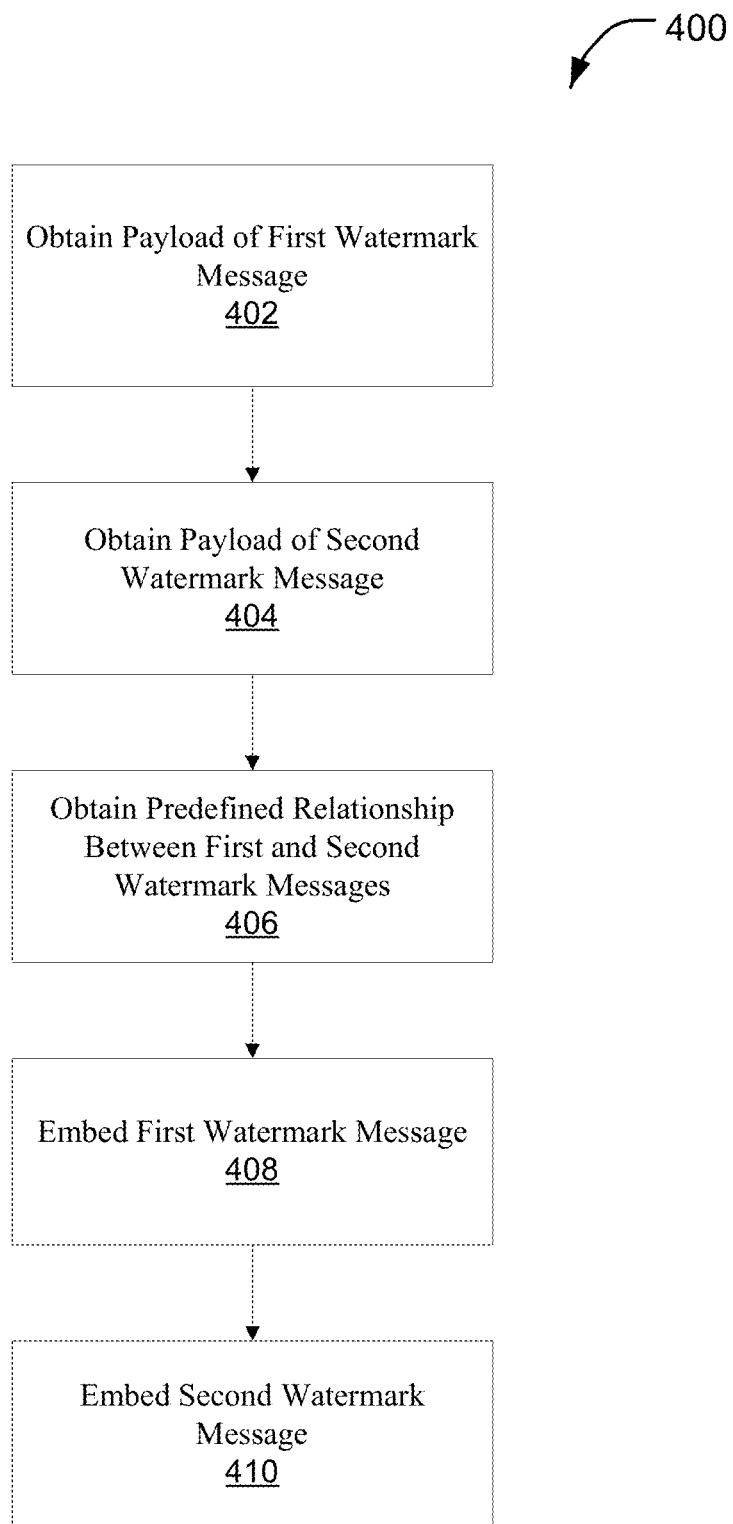
FIG. 4 is a set of operations for embedding watermarks in a content in accordance with another exemplary embodiment.

FIG. 4 illustrates a set of operations 400 that can be carried out to embed multiple watermark messages in a coordinated fashion in accordance with an exemplary embodiment. At 402, watermark payload for the first watermark message is obtained. The operations at 402 can include obtaining a particular bit pattern that represents a watermark state, such as a particular copy control state, in addition to obtaining of error control bits, channel coding bits, synchronization bits, etc., that can be formed into a packet. Such a packet of bits may further be subject to scrambling, interleaving, encryption and other operations that are carried out on the packet bits prior to the embedding of the bits into a host content. It should be noted that in the description of FIG. 4, a watermark packet has been described as comprising a number of bits. However, it is understood that a watermark packet is generally comprised of certain number of "symbols," where each symbol can be binary or non-binary valued.

Referring back to FIG. 4, at 404, watermark payload for the second watermark message is obtained. The operations at 404 can include obtaining a self-assigned code, a time-code, an serial number, and/or other information that are to be embedded as part of an EP watermark. The operations at 404 can also include the addition of error correction bits, synchronization bits, and other packet forming operations that were discussed in connection with step 402. At 406, a predefined relationship between the first watermark message and the second watermark message is obtained. For example, the predefined relationship can be based on a predefined template prescribing the temporal position of the bits of the first watermark message relative to temporal position of the bits of the second watermark message in an audio content. In other examples, the pre-defined relationship can exist in spatial and/or frequency domains. Such a predefined relationship can prescribe the relative positions of the symbols of the first watermark message with respect to the symbols of the second watermark message in a particular domain. Based on such predefined relationship, the portions of the host content embedded with the first watermark message do not overlap, in that particular domain, with the portions of the host content embedded with the second watermark message.

At 408, the first watermark message is embedded and, at 410, the second watermark message is embedded. It should be noted that both watermark messages can be embedded in a single session, or in separate embedding sessions. Moreover, in some embodiments, the operations at 404, 406 and 410 are carried out separate from, and at a later time than, the operations at 402 and 408. In an alternate embodiment, the operations at 402, 406 and 408 are carried out separate from, and at a later time than, the operations at 404 and 410.

Besides coordinated embedding across time, space and/or frequency domains, in some embodiments, embedding coordination across different watermarking technologies is also maintained. In particular, certain watermarking technologies that are robust against synchronization attacks can be embedded in a predefined relationship to watermarking technologies that are particularly suitable for carrying large payloads. The utilization of different types of watermarking technologies further facilitates coordinated extraction of watermarks, where, for example, the detection of a watermark with superior synchronization characteristics can precede the detection of the a watermark that carries a large payload.

Furthermore, the watermark embedding coordination that is carried out in accordance with the disclosed embodiments can be carried across different elementary components of a multimedia content. For example, for an audiovisual content, the embedding of audio and video watermarks can be coordinated based on the disclosed embodiments. In one example, the detection of audio watermarks precedes the detection of video watermarks. The information obtained from the detection of audio watermarks can then be used to facilitate the detection of video watermarks that often require a larger processing load.

Another important aspect of a watermarking system is the security of watermarks (i.e., how easily the embedded watermarks can be detected, altered and/or removed by unauthorized parties). In some attack scenarios, security of watermarks can be compromised through differential analysis of the content before and after embedding of watermarks. In other scenarios, an attacker may attempt to perform differential analysis on two contents that are embedded with different watermark values. Certain techniques are available to thwart such analysis by, for example, masking the watermark signal to resemble random (and potentially) large phase variations. However, such masking techniques often involve manipulation of the content, which can create perceptible artifacts when such masking operations are repeated as additional watermarks are embedded into the content during different embedding sessions.

In accordance with the disclosed embodiments, coordinated embedding of different watermark messages can be carried out by embedding the bits associated with different watermark bits and applying a single masking operation. As such, security features associated with applying the masking operation are maintained without compromising the transparency of the embedded watermarks.

Another important advantage of coordinated embedding of the disclosed embodiments relates to facilitating the workflow of operations in a content production facility. Typically content production is associated with tight schedules and resources. Under these conditions, independent embedding of multiple watermark layers, the associated quality assurance operations, and equipment and storage maintenance can be burdensome. The coordinated watermark embedding operations of the disclosed embodiments reduce the number of embedding operations, as well as the associated workflow and maintenance requirements. Such workflow-related improvements are particularly advantageous if the embedding process must be repeated a multiple number of times on the same content. For example, a particular watermark embedding may be required to designate a content as a theatrical release versus a home video, while different embeddings may be needed to differentiate a high-definition release from a standard definition release, an electronic distribution versus a hard copy release, a pre-screener, region code, etc.

In order to further streamline the embedding workflow and minimize the potential for human error during the content production, it is important to minimize user interaction with the embedder engine. When an EP watermark is designed for content identification, the selection of EP values for embedding and associating the selected EP values with the metadata of the particular content can be prone to errors in the final stages of content production.

In accordance with some embodiments, this burden is alleviated in-part by using self-assigned EP values created automatically by the embedder. It is important to ensure that all embedded EP values are unique, i.e. the same EP value doesn't appear in two distinct contents. In one example embodiment, the set of all possible EP values is divided into separate distinct sets and each set of EP values is assigned to a particular embedder. In this example embodiment, each embedder uses a new EP value whenever a new content is submitted for embedding. For example, an embedder running in file mode (i.e., an embedder that operates on a content that is stored in a file) may assume that each file contains a single content and may assign a single EP value per file. Note that a long content may be broken into multiple files, e.g. a feature movie may be broken into reels. According to some embodiments, a user may instruct the embedder to use the same EP value on multiple files. However, in other embodiments, distinct EP values are used for each file, and later, the content is associated with a list of EP values.

According to some embodiments, an EP watermark payload that is designed for content identification contains two fields: Embedder Identification (EID) and Serial Number (SN). The EID field ensures that distinct embedders always create distinct EP values. The SN field is used to distinguish different files embedded with the same embedder. It is essential that the SN field is changed from one input file to another (or more generally, for each embedding session that may include embedding of only portion of the content) in a predefined manner, so that it is not used twice by the same embedder. It is also important that the SN value is saved in, for example, an embedder log file prior to deactivation of the embedder. This way, the embedder can read the embedder log file and continue the orderly process of creating a new SN value upon its next activation. In one example, the SN field is simply incremented by one after each file is processed by the embedder. In other examples, more complex algorithms can be used to ensure that a unique SN value per file is generated. In some embodiments, the embedder can also detect when an allocated set of SN values is exhausted. In such scenarios, the embedder may request additional set of SN values from a higher entity in the decision making hierarchy. For example, the embedder may transmit a request to a central authority to obtain the needed allocation of additional SN values.

When a self-assigned EP value is detected by a content handling device (e.g., a user device), the detected EP value can be used to access certain metadata that is stored at a database. The metadata may, for example, identify the content, the filename, the size of content, and the like. By the way of example, and not by limitation, the metadata includes a content name, content owner, content maker (e.g., artist, director, producer, etc.), content serial number, an industry-standard content identification code, dates corresponding to generation and last modification of the content, content length and content copyright status. The disclosed embodiments further facilitate the generation and retrieval of such metadata. As discussed earlier, it is desirable to avoid manual entry of metadata into the database during the embedding process. According to one example embodiment, the metadata database can be automatically populated, at least in-part, by associating a self-assigned EP value with the filename and/or part of the data fields that may reside in the file header. In some embodiments, the associating can be carried out by the embedder, by a module or entity that resides at the database, or by a separate module or entity. In an alternate embodiment, the association may established cooperatively by entities or modules that reside at different locations (e.g., at the embedder, at the database, and elsewhere).

Figure 11:
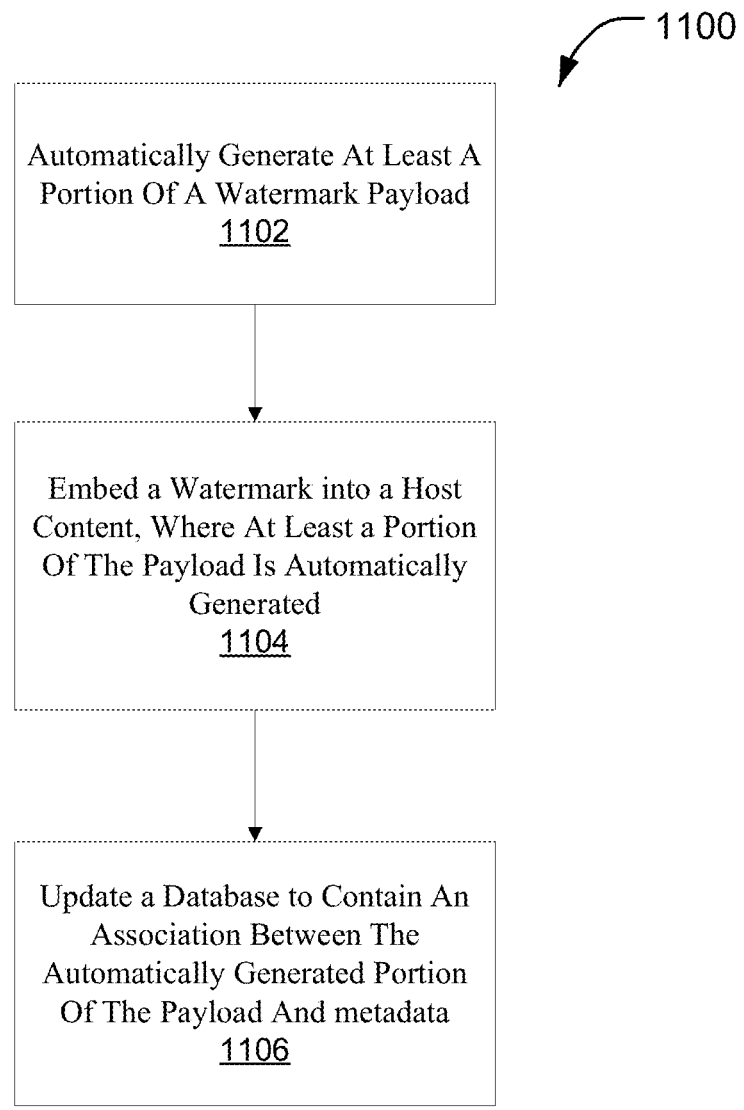
FIG. 11 illustrates a set of exemplary operations that can be carried out to facilitate updating watermark-related information at a database in accordance with an exemplary embodiment.

FIG. 11 illustrates a set of exemplary operations 1100 that can be carried out to facilitate updating watermark-related information at a database in accordance with an exemplary embodiment. At 1102, at least a portion of the payload of a watermark is automatically generated. For example, such a portion of payload may be a serial number that is automatically incremented for each new content (or segment of the content). At 1104, the watermark is embedded into a host content. Such a watermark has a payload that, at least in-part, is comprised of the automatically generated portion. At 1106, the database is updated to contain an association between the automatically generated portion of the embedded watermark and metadata. The metadata comprises one or more identifiers of the host content.

In embodiments that the association is established outside of the database, the association information may then be stored in an embedder log and subsequently uploaded to the database without any interruption of the embedding workflow. By reference to FIG. 1, in one example, the embedder logs may be stored at the storage 114. The above noted generation of embedder logs and their availability at a database may not always be feasible. For example, a standard definition of filenames and header files may not exist. Moreover, a finished content may be created from multiple files, such as reels in movie production that is even further edited subsequent to the embedding of individual content files.

In one embodiment, providing an association between the EP values and metadata includes establishing the association after a content has been embedded and finalized, or even after the embedded content has been distributed to the public. In such embodiments, the association of the EP values may be based on information such as title, owner, release date, etc., of the content that is publicly available after the release of a content. Such information can, therefore, be readily uploaded from public sources. The finalized or released content can then be subjected to a watermark extraction process in order to obtain the value of the embedded EP watermarks, including the automatically generated portion of the embedded watermarks. The detected EP watermark can subsequently be associated with one or more identifiers of the host content (e.g., the title, owner, etc.) and then stored at a database. By the way of example, and not by limitation, these identifiers can include an International Standard Audiovisual Number (ISAN), a stock keeping unit (SKU), a Uniform Recourse Identifier (URI), a Universal Product Code (UPC), an Advanced Television Systems Committee (ATSC) content identifier, and/or other identifiers in either standard or proprietary numbering systems, as well as descriptive information about the content such as original name, release year, producer, director, cast, genre, story and the like.

In some embodiments, updating the database to include the association between the watermarks and the corresponding metadata can be done manually to establish such an association between at least the automatically-generated portion of the payload with the one or more identifiers of the host content. In some embodiments, the content identifier(s) may reside at a separate database. In such scenarios, the database can be updated (e.g., populated) by looking up the EP watermark payloads in a third-party registry where EPs are registered and associating with one or more content identifiers. For instance, the association can be established during embedding of EP watermarks or during a watermark verification process. The watermark verification process is conducted to ascertain whether or not the host content includes embedded watermarks, and in some applications, whether or not the embedded watermarks have the proper embedded payload values and/or can be detected in sufficient quantities from the content.

In some embodiments, updating the database can be carried out as a two-step process, in which, the first step includes associating the watermark payloads (e.g., the automatically generated portion of the payload) with some metadata. Then as a second step, the associated metadata is used to look up one or more content identifiers.

In some embodiments, the locations of each detected EP watermark within a finalized or released content may also be saved. This information can later be used to analyze the extent and nature of the processing of the content in subsequent to the initial embedding of the watermarks. For example, a failure to detect a significant portion of the embedded EP watermarks may indicate poor quality of the content, for example, due to camcordering, even if the content is saved in high-definition format. During piracy attempts, a content may undergo significant distortions that are due to, for example, camcorder captures, perceptual compression, and other processing operations that are intended to remove the embedded watermarks. As a result, some of the embedded watermarks may be distorted beyond recognition while other watermarks may still survive.

In some embodiments, devices in the field that are equipped with watermark detectors may report various information, such as the locations of extracted watermarks, the type and extent of error correction and distortion compensation techniques used to enable recovery of embedded watermarks, and other information related to the detected EP watermarks. The reported information can be collected and analyzed to assess the effectiveness of different piracy channels and to devise appropriate countermeasures.

According to the disclosed embodiments, self-assigned EP watermark values may also include a time-code. In one example, such a time-code indicates the offset of the EP watermark with respect to the beginning of the content. This approach may be useful if a user chooses to submit for embedding a file that contains a set of distinct contents, e.g. a number of files are concatenated before embedding. If the concatenated files are embedded using the embedder ID and serial number only, all the files (i.e. distinct contents) will carry the same watermark payload and cannot be distinguished. However, if time codes are embedded in the concatenated file, even if the same embedder ID and serial number are embedded, it is possible in post embedding analysis to associate a different set of EP values, having distinct time codes, with each of distinct contents, thereby providing a mechanism for uniquely identifying each content.

Embedded time-codes can be used to identify partial reproductions of a content within a distinct work, or to identify out of order reproduction of the content (as in a mash-up). Similarly, time-code information may be used to identify spurious capture of a content during, for example, creating a home video while a content marked with audio watermarks plays in the background. In particular, a home video that contains spurious recordings of a watermarked content usually does not include the time-codes from the beginning or ending of a watermarked content. Further, such a home video is likely to contain a broken timeline of watermarks that is indicative of frequent record-stop record actions. In contrast, a pirated content is expected to contain an uninterrupted timeline of watermarks that spans the entire content.

In some cases, it is desirable to know which portions of a content are being currently played (e.g. which scenes, dialog portions, tunes, etc.). Such information can further enable external special effects (outside the playback) that are provided in synchronization with the content that is being currently played back. For examples, such special effects can include external sounds, visual effects, controlled access to switches, buttons or keys, and the like, that may enhance the user experience, or may entertain, educate, or advertise. The detection of time-codes that are embedded in accordance with the disclosed embodiments enable the extraction of timing information that is necessary to enable interaction with outside entities (e.g. remote servers) to, for example, provide audio-visual special effects or metadata that are contextually relevant.

In the case real-time embedding, such as the case where a live event is embedded on-the-fly, the self-assigned codes may not have the SN field at all, and the content identification may be solely achieved using the EID and time-codes. The time-code value that is embedded in each segment of a content may be referenced to the beginning of the embedding process. The time code may, additionally, or alternatively, be associated with the absolute date-and-time saved in the embedder log. In one example, the time-code may represent the minute count from the beginning of the 21$^{st}$ Century. Such a time-code can be provided by using a 26-bit field that can uniquely identify each minute of this century. Using such an absolute time-code, in scenarios where SN field is not used (or is not present), the detected EID value can be used to identify the transmission source (e.g., the broadcast station) and detected time-code can be used to determine the particular programming of the transmission source, without retrieving the embedder logs. For example, publicly available station schedules can be used to obtain programming information.

It should be noted that, in some embodiments, each segment of a content can carry multiple watermarks with the same time-code information. This approach is beneficial since it increases the likelihood that at least some, if not all, watermarks can be embedded within a content even if certain sections of the content are not able to support the embedding of watermarks. Moreover, the embedding of multiple watermarks produces a level of redundancy that enables the recovery of a time-code even if some of the embedded watermarks are distorted or degraded due to content processing.

In the sections that follow, example procedures for determining the playback timeline of a content based on self-assigned time-codes are provided. The required accuracy for timeline identification can vary based on the particular application of the timeline identification. In one example, the detection of embedded watermarks triggers the insertion of certain advertisements during a specific scene within the content. While, in this example, it is important that the scene is properly identified, the timing accuracy of the delivery of the advertisement may not be critical. In contrast, the accuracy of timing information identification may be critical in other applications, such as when the detection of an embedded watermark triggers the playback of a prerecorded tune that must be played back in synchronization with the original content.

Consider the case where the time-code is sequentially increased after every time-code interval, Tc, while the EID and the (optional) SN are left unchanged. Further, assume that every watermark embedded within the interval [(N−1)*Tc, N*Tc], for N=1, 2, 3, . . . , carries the time-code N. Now assume that the watermark extractor finds a watermark with time-code N located within bounds [T1, T2], where T2−T1<Tc (i.e. the watermark duration is shorter than the time-code interval). In some embodiments, Tc is known to both the embedder and the extractor. T1 and T2 are time values designating the start and end of the time-code N that are measured at the extractor. In one example embodiment, T1 and T2 are measured relative to the beginning of the playback of the content (i.e., the time elapsed since the start of content playback). In another example embodiment, T1 and T2 are measured relative to the beginning the activation of the extractor. In still another example embodiment, T1 and T2 are time values that are produced by a real-time clock at the extractor. Regardless of how T1 and T2 are measured, in some embodiments, the reference value (e.g., the zero time point) for T1 and T2 measurements is not critical as long as the same time measurement technique is used for relevant actions of the device, such as contextual advertisement, enforcement actions and the like. Using the above information, it can be estimated that the $N^{th}$ time-code interval has started at:

$$T(N)=(T1+T2-Tc)/2 \qquad (1).$$

In Equation (1), T(N) represents the start of the $N^{th}$ time-code interval. The timing error, Te, associated with T(N) is given by:

$$Te=\pm(Tc+T1-T2)/2 \qquad (2).$$

If multiple watermarks with identical time-code, N, and identical EP values are detected, the interval [T1, T2] can be adjusted so that T1 corresponds to the beginning of the first such watermark, and T2 corresponds to the end of the last such watermark. Note that, in the best case, we could obtain T2−T1=Tc, T(N)=T1, and Te=0.

Now consider one or more watermarks that are detected with the next time-code value, N+1, located within bounds [T3, T4], all having the same EID and (optionally) SN values. With this information, it can be estimated that the $(N+1)^{st}$ time-code interval has started at:

$$T(N+1)=(T3+T2)/2 \qquad (3).$$

In Equation (3), T(N+1) represents the start of the $(N+1)^{st}$ time-code interval. The timing error, Te, associated with T(N+1) is given by:

$$Te=\pm(T3-T2)/2 \qquad (4).$$

Note that the best accuracy is achieved when T3=T2, i.e. Te=0. In the case that is illustrated by Equations (3) and (4), the timing information is extracted by observing the transition between two time-codes, while case that is illustrated by Equations (1) and (2), the timing information is obtained by observing the range of a particular time-code.

In some embodiments, the watermark extractor, or a component therein, continually calculates, and keeps track of, the start times of the time-code intervals and the associated errors. Based on the error value, a new Tc start-time can be set as a reference time-code interval start time and used for further time measurements. For example, an error value below a threshold, an error value of zero, a minimum error value within a range of possible error values, and the like, can trigger the setting of the new start-time. Alternatively, or additionally, any error value that is smaller than the one associated with the current Tc start-time can trigger the setting of a new Tc start-time. The selection of a new Tc start-time allows the measurement of time, with accuracy Te, by measuring playback time of the content by, for example, counting video frames or audio samples.

The extracted time-codes can also be used to detect content manipulation, such as cuts, insertions, and/or content reordering. For example, consider a detection of time codes N and M in intervals [T1, T2] and [T3, T4], respectively, where T3>T2. Content reordering can be established if M<N. Insertions can be established if:

$$T(4)-T(1)>(M-N+1)Tc, \qquad (5).$$

Cuts can be established if:

$$T(3)-T(2)<(M-N-1)Tc, \qquad (6).$$

Figure 5:
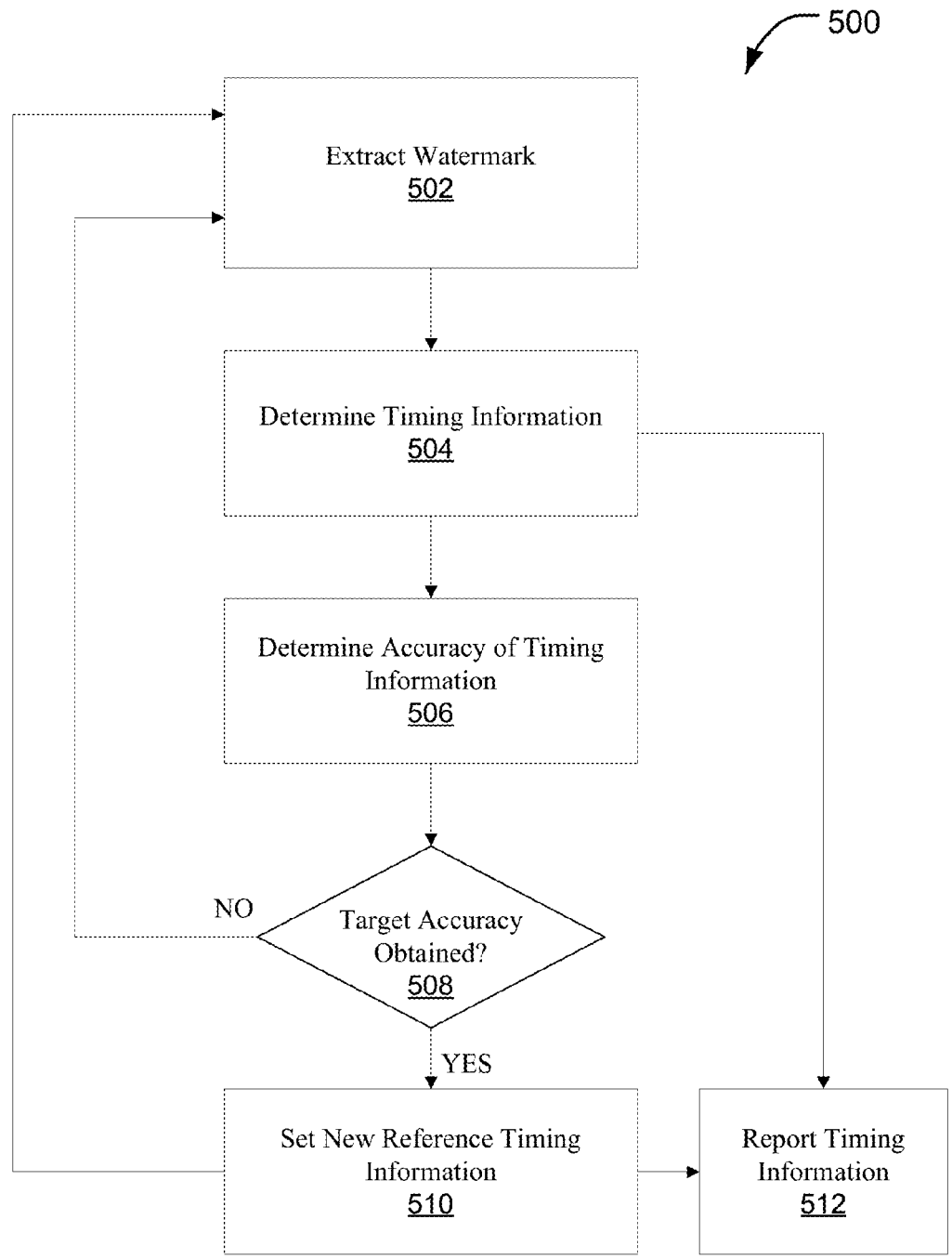
FIG. 5 a set of operations for extracting watermarks in a content in accordance with an exemplary embodiment.

FIG. 5 illustrates a set of operations 500 that can be carried out to determine timing information of an embedded content in accordance with an exemplary embodiment. At 502, an embedded watermark is extracted from a host content. The embedded watermark can be an EP watermark that contains a time-code in accordance with the disclosed embodiments. At 504, timing information is determined from the extracted watermark. In one example, the timing information at 504 is obtained using Equation (1). In another example where at least two watermarks have been extracted, the timing information at 504 is determined using Equation (3). At 506, the accuracy of the timing information is determined. The accuracy, in one example, is determined by evaluating the timing information error using equation (2). In another example where at least two watermarks have been extracted, the accuracy at 506 is determined by evaluating the timing information error using equation (4).

At 508, it is determined if the target (or desired) accuracy has been obtained. Such a target accuracy can, for example, correspond to a zero-valued timing information error that is computed using Equations (2) or (4). In other examples, the target accuracy may correspond to a timing information error that is lower than previously computed timing information errors. In still other examples, the target accuracy can correspond to the minimum timing information error value computed for several consecutive extracted watermarks. If the determination at 508 indicates that the target accuracy is obtained, the operations 500 continue at 510, where a new reference timing information is set. For example, a new time-code interval start-time can be set as a reference time-code interval start time and used for further time measurements. Upon setting the new reference timing information at 510, the operations 500 can return to 502 to extract another embedded watermark.

If the determination, at 508, indicates that the target accuracy is not obtained, the operations 500 continue to 502, where a new watermark is extracted. The timing information, as well as the associated accuracy, may be reported, at 512, to a user and/or to other entities or components that are interested in obtaining the timing information. FIG. 5 illustrates that the reporting at 512 is carried out upon the determination of the timing information at 504, as well as upon setting a new timing reference information at 510. Additionally, or alternatively, the reporting of timing information at 512 may be performed upon the completion of the operations at 506 and/or 508.

In some embodiments, the extraction of multiple watermark messages is conducted in such a way that certain knowledge (such as locations and embedding methods) associated with each extracted watermark is shared during the extraction of other types and/or the same type of watermark. The coordinated extraction operations that are conducted in accordance with the disclosed embodiments can be performed in a single watermark extraction session (sometimes referred to as a single-pass extraction), or in multiple passes or sessions. In multi-pass or multi-session extraction, the information associated with the extraction of watermarks in a first pass can be used during the subsequent extraction sessions.

Some of the disclosed embodiments are described in the context of coordinated extraction of CCI and EP watermarks. However, it should be understood that the disclosed embodiments are equally applicable to the extraction of other watermark messages.

CCI watermarks illustrate a practical use case for the implementation of the disclosed embodiments since some content owners presently require CCI watermark extractors (also sometimes referred to as watermark detectors) as a precondition for access to the premium content (such as high-definition content, new releases, content in 3D format, content with additional features such as director's commentary, etc.). In one example, such a mandate for having watermark extractors is implemented by providing content decryption keys only to devices or software applications that are compliant, i.e., those devices or software applications that implement CCI watermark detectors and observe CCI enforcement policies.

EP watermarks, as noted earlier, may serve various purposes such content identification and/or forensic tracking. In forensic tracking applications, the payload of an EP watermark can be used to uniquely identify each copy of a content that has been received by a particular recipient, or has been distributed through a particular distribution channel. If the content is misused, e.g. copied and redistributed without permission, the responsible party can be identified. Typically, this type of application requires a large watermark payload, which negatively affects the watermark robustness. Furthermore, the attacker may obtain multiple copies of the same content that is embedded with different watermarks and combine them (e.g., cutting-and-spicing different segments from different copies, averaging the content across all copies, etc.) in order to prevent watermark extraction, which is often called collusion attack. Coordinated embedding of a payload that is not copy-dependent and thus not susceptible to collusion attack, can be used for automatic identification of the presence of forensic watermarks, which can trigger forensic analysis of the watermarked content. Since forensic watermarks are often less robust than copy independent watermarks, such as CCI watermarks, the presence of robust copy-independent marks can facilitate the identification forensic marks in a content that has been subjected to collusion attack. Forensic analysis of the attacked content may include additional, and often computationally expensive, operations that can lead to the extraction of embedded forensic marks. For example, such additional operations can include, but are not limited to, comparison of a received content to the original content, comparison of the candidate extracted watermarks to a list of possible embedded forensic marks (e.g., using template matching techniques) and utilizing more powerful error correction techniques (e.g., iterative decoding, soft error correction, etc.). These additional operations can be justified only if there is a strong confirmation that forensic marks are indeed present in the content. Such a confirmation can be provided by the detection of copy-independent watermarks in the content.

The extraction of EP watermarks in a consumer device can provide additional benefits such as enabling automatic recognition of a song title or a product when alternate methods of identification, such as printed name or a bar code, are unavailable or unsuitable. As noted earlier, EP watermarks can also be used to enable interactions with outside entities or to provide enhanced viewing experiences by triggering the insertion of special effects into the content. The implementation of a stand-alone EP watermark extractor, however, implies significant cost increases in terms of development effort and processing resources at the consumer devices. In some scenarios, EP watermarks may coexist with CCI watermarks within the same content. In these scenarios, EP watermarks may need to be extracted in the same extraction session as CCI watermarks and/or in a different session (or even at a different location) during the content lifecycle. The disclosed embodiments further facilitate the inclusion of EP watermark detectors in consumer devices by coordinating the operations associated with the extraction of EP and CCI watermarks, thereby reducing the processing load that would have been required if stand-alone CCI and EP extractors were deployed.

According to the disclosed embodiments, the extraction of EP watermarks can be facilitated based on a predefined relationship between the embedded EP and CCI watermarks. Such a predefined relationship can, for example, prescribe a pre-defined arrangement of the EP and CCI watermark bits relative to one another in spatial, temporal and/or frequency domains.

Figure 6:
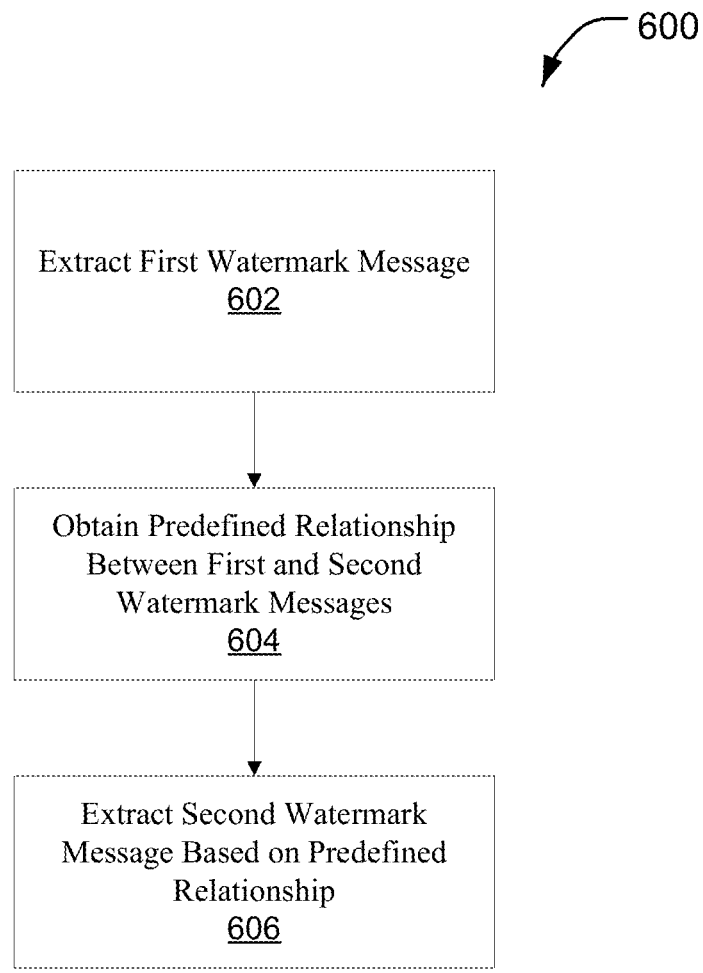
FIG. 6 a set of operations for extracting watermarks from a content in accordance with an exemplary embodiment.

FIG. 6 illustrates a set of exemplary operations 600 that are carried out to extract multiple watermark messages in accordance with an exemplary embodiment. At 602, a watermark message is extracted. The watermark message that is extracted at 602 can, for example, correspond to a CCI watermark. At 604, a predefined relationship between the first watermark message and the second watermark message is obtained. The second watermark message can, for example, correspond to an EP watermark. In one example, the predefined relationship corresponds to a template that specifies temporal locations of each bit within the second watermark message with respect to one or more bits of the first watermark message. In other examples, the predefined relationship can specify predefined arrangements of bits of the two watermark messages in spatial and/or frequency domains.

Referring back to FIG. 6, at 606, the second watermark message is extracted based on the predefined relationship that was obtained at 604. For example, particular temporal locations within the content that are expected to contain bits of the second watermark message can be processed in order to extract the bits of the second watermark message.

According to the disclosed embodiments, the inclusion of an EP watermark extractor in addition to an existing CCI watermark extractor is effected at a small incremental cost. As described earlier, the EP watermarks can be embedded as a symbol-replacement of a fraction of CCI watermarks without a change in watermarking technology. Therefore, the certain operations (and the associated components) that are needed for the extraction of individual watermark bits, such as filtering and correlation computations, can be carried out once to enable coordinated detection of both CCI and EP watermark symbols. The only additional processing that is required pertains to pattern recognition (e.g., packet formation and decoding) of EP watermarks, and subsequent interpretation of the detection results. The additional processing operations are typically carried out with little additional cost.

Figure 7:
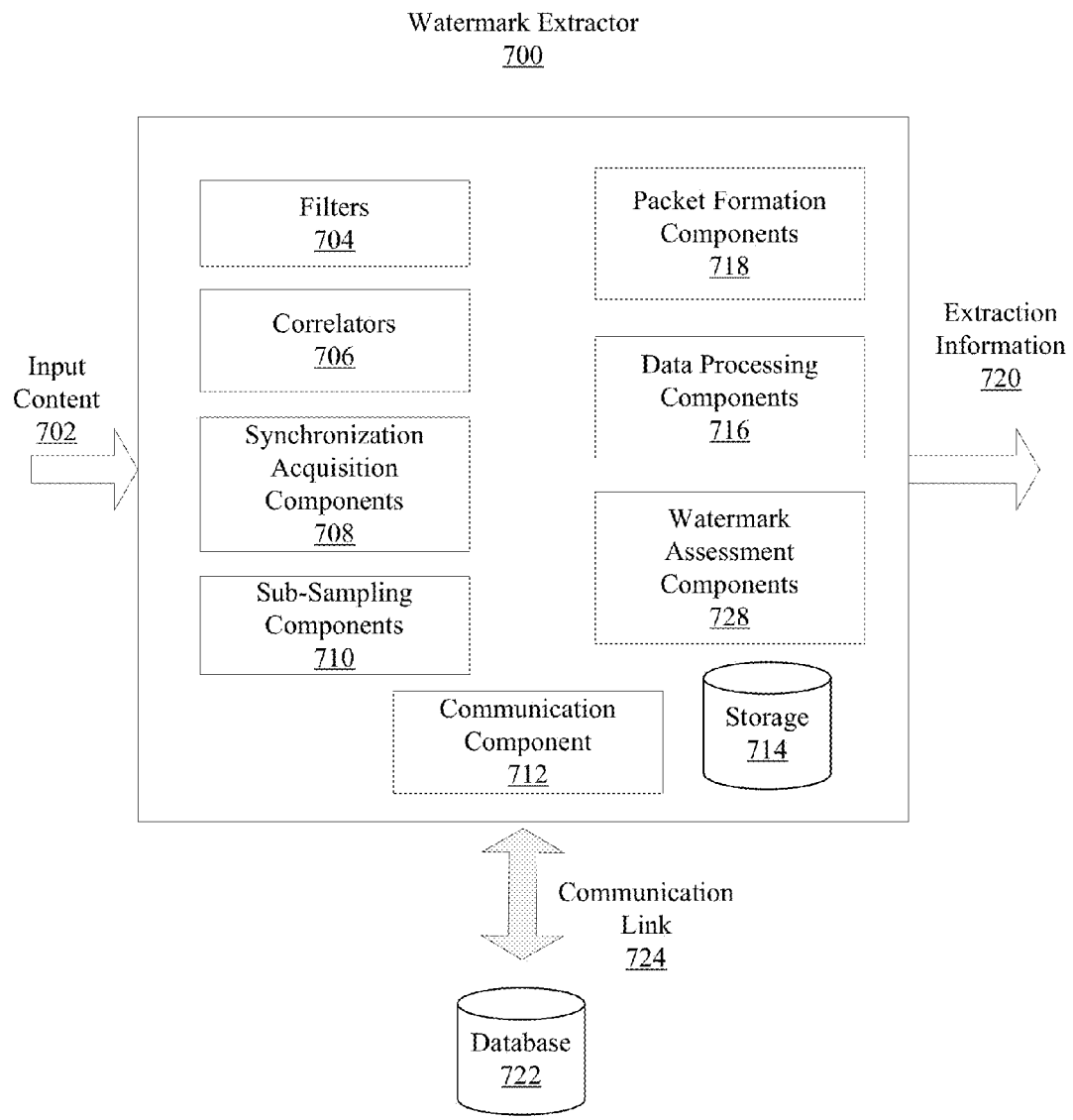
FIG. 7 is a block diagram of a watermark extractor in accordance with an exemplary embodiment.

FIG. 7 is a block diagram of an exemplary watermark extractor 700 that can be implemented in accordance with the disclosed embodiments. The watermark extractor 700 may be part of a content handling device that is capable of conducting one or more operations such as rendering, recording, copying, transferring and/or playback of an input content 702. The input content 702 may be communicated to the content handling device through one or more communication channels comprising wired and/or wireless communication channels, magnetic, optical, Flash and/or other computer readable media, or other sources. The content handling device may also be capable of connecting to external entities and networks, such as the Internet. Connection to such external entities and/or networks may be carried out in-part using the communication link 724.

FIG. 7 further illustrates certain components within the watermark extractor 700. It should be noted that FIG. 7 is not intended to provide an exhaustive depiction of every component within the watermark extractor 700 and, therefore, additional, or fewer components may reside within the watermark extractor 700. Further, while FIG. 7 shows individual components that are configured to carry out specific operations, it is understood that such a depiction is merely provided to facilitate the understanding of the disclosed embodiments. As such, one or more components of the watermark extractor 700 may be combined other components of the watermark extractor 700. Further, some of the operations necessary for carrying out the extraction operations may be conducted outside of the watermark extractor 700. It should be further noted that the components within the watermark extractor 700 may be implemented in hardware, software and/or combinations thereof. In some embodiments, some or all of the components of the watermark extractor 700 are implemented using one or more processors that execute a program code that resides on computer readable medium.

Referring back to FIG. 7, the watermark extractor 700 receives the input content 702. The input content 702 may undergo a number of signal processing operations such as filtering, sub-sampling, correlation computations, synchronization acquisition and the like. These operations, which are sometimes referred to as back-end processing operations, typically are computationally expensive. In FIG. 7, the watermark extractor 700 is equipped with filters 704, correlators 706, synchronization acquisition components 708 and sub-sampling components 710 that are configured to carry out the above noted operations. Back-end processing operations typically depend on the watermarking technology and, therefore, the watermark extractor 700 may include additional back-end processing components that can operate according to additional watermarking technologies.

FIG. 7 also illustrates packet formation components 718 and data processing components 716 that are configured to form watermark packets, and extract watermark bits from the formed packets. Such operations can include, but are not limited to, template matching, error correction decoding, de-interleaving, de-scrambling, decryption, and the like. These operations, which are sometimes referred to as front-end processing operations, are typically less computationally expensive than back-end processing operations. The data processing components 716 can also be responsible for obtaining a predefined relationship between the embedded watermarks from an entity that is internal (e.g., storage 714) or external (e.g., database 722) to the watermark extractor 700. In general, various components that are shown in FIG. 7 as part of the watermark extractor 700 may reside outside of the watermark extractor 700. In such a scenario, the various components that reside outside of the watermark extractor 700 are in communication with the watermark extractor 700 to send and/or receive data, control, synchronization and other information to and/or from the watermark extractor 700 or one or more components therein.

In embodiments that utilize the same technology for embedding both the CCI and EP watermarks, coordinated extraction of multiple watermark messages can be efficiently carried out by conducting all or a portion of the back-end processing operations only once. In these embodiments, all or a portion of the front-end processing operations may be carried out for each type of embedded watermark message. However, the front-end processing operations typically do not require a significant processing load. Front-end processing operations are further streamlined when some of the front-end processing operations associated with one type of watermark message, such as an EP watermark, are carried out based on a predefined relationship with the bits of other types of watermark messages, such as a CCI watermark.

The watermark extractor 700 of FIG. 7 outputs certain extraction information 720. In some embodiments, the output extraction information 720 includes raw watermark bits, such as CCI bits, EID values, time-codes, and the like. In other embodiments, the output extraction information 720 additionally, or alternatively, includes a detected watermark state. For example, a detected watermark state can correspond to a no-home-use state. In still other embodiments, the output extraction information 720 additionally, or alternatively, includes commands, texts, and other information that are generated pursuant to the detection of the embedded watermarks and/or application of the associated enforcement policies.

The watermark extractor 700 also includes a communication component 712 that enables the watermark extractor 700 to communicate with other entities and components, such as the database 722, through the communication link 724. The database 722 can, for example, include metadata associated with a particular content. In some embodiments, the communications between the watermark extractor 700 and the database 722 includes the transmission of extracted watermark bits and the reception of information such as enforcement rules, enforcement rule alternatives and other information. In some embodiments, watermark assessment components 728 can be responsible, at least in-part, for assessing the enforcement policies associated with the extracted watermark bits, presenting a particular enforcement policy to the user and determining if an exception to the watermark enforcement policies exists. The watermark assessment components 728 can be configured to communicate with internal storage units 714, and/or external entities, such as database 722, through, for example, communication link 724.

FIG. 7 also illustrates one or more storage units 714 that can reside within the watermark extractor 700. Such storage units 714 can store the input content 702 (e.g., in encrypted, partially encrypted or clear format), the output extraction information 720, metadata, compliance rules associated with the usage of embedded content and the associated enforcement actions, information that describes predefined relationships between multiple watermark messages, as well as computer program code that can be retrieved in order to implement any one of the functionalities of the disclosed embodiments. The storage unit 714 can be in communication with various components of the watermark extractor 700 such that these components can retrieve and utilize the information, the program codes and the content that are stored on the storage units 714.

According to some embodiments, the extraction of CCI watermarks is used as the first step in the process of coordinated extraction of CCI and EP watermarks. Due to having a smaller payload, the CCI watermarks are inherently more robust than EP watermarks. As such, when CCI watermarks are successfully extracted, the extraction of EP watermarks can be attempted is a subsequent procedure. In these embodiments, the full processing load associated with the extraction of independent EP watermarks is only rarely scheduled. Moreover, in an unmarked content (e.g., a content that does not include CCI watermarks), the EP watermark extractor may never be invoked. The latter example scenario related to an unmarked content is important since it can preserve memory, time and computational resources. More specifically, some user devices automatically initiate a search for embedded watermarks for all new content that is received by that user device. In such devices, the EP extraction operations are not triggered since the content does not include CCI watermarks.

Another benefit of the disclosed embodiments associated with utilizing a predefined relationship between the CCI and EP watermarks subsequent to the successful detection of CCI watermarks is that the probability of false EP watermark extraction becomes small. This, in turn, enables the embedding of EP watermarks to be done more efficiently by including no (or a reduced amount of) overhead bits associated with, for example, error detection codes, error correction codes and the like. In one example embodiment, EP watermark packets are designed without a packet header that would be normally used to establish the beginning and/or the end of the watermark payload. In such example embodiments, CCI watermarks that are extracted prior to the extraction of EP watermarks fulfill the role of synchronization headers. In fact, in those embodiments, the reliability of CCI watermark extraction can be significantly better than the reliability of typical synchronization header extraction operations. In particular, a well-designed CCI extraction system may produce one false positive per 100,000 years of continuous extraction operation, while a well-designed synchronization header may produce a false synchronization header detection every 10 hours. While the detection of a CCI watermark with high reliability (i.e., with a low false detection probability) can strongly signal the presence of a non-CCI watermark, the detection of a CCI watermark with a false detection probability rate that is higher than what would typically be desired for CCI applications can also trigger an extraction attempt for recovery of the associated EP watermarks. In other examples, a synchronization header is included in the EP watermark packets to further improve the robustness of EP watermark extraction, and/or to allow the extraction of EP watermarks independently from CCI watermarks.

Successful extraction of an EP watermark following a successful CCI watermark extraction provides further assurances that the extraction of the preceding CCI watermark(s) were successful, and improves false watermark detection probability of the CCI watermarks. As such, in some embodiments, CCI watermark packets may be designed to produce a higher false detection probability rate than is required for the copy control system. However, in these embodiments, coordinated detection of the EP and CCI watermarks can collectively achieve the desired false positive detection probability rate. In another embodiment, the detection of an EP watermark may trigger the watermark extractor (or an associated component or entity) to access a database. If a match to the detected EP watermark is obtained within the database, the associated CCI payload can be reported to the extractor (or an associated component or entity) to trigger the appropriate copy control enforcement action. This mechanism can provide a confirmation procedure for verification of the extracted CCI watermark value. In addition, it can allow the application of CCI enforcement policies without the detection of the CCI watermark from the content.

In some embodiments where a CCI watermark is extracted and the EP watermark is not, the coordinated CCI and EP watermark extractor can determine the expected location and payload of the EP watermark. In one example, the watermark extractor assumes that there are no cuts or insertions in the content since the last extracted EP watermark. The extractor can then determine the expected EP watermark value (e.g., the EID, SN or time-code) at the expected location of EP watermark. Once a candidate EP watermark value from the expected EP watermark location is extracted, the candidate value can be compared to the expected EP watermark value in order to ascertain if a match with sufficient confidence level exists. In other examples, the extractor may anticipate some cuts or insertions in the content and predict a set of possible EP watermarks that can be detected when such cuts and insertions are present. The extractor may then ascertain which of the possible EP watermarks provides the best match to the detected candidate watermark value. In case of a match with the sufficient confidence level, the extractor can use this information to proceed with updating timing extraction and content integrity verification (i.e. detection of cuts or inserts).

Note that, according to the disclosed embodiments, the playback timeline can be established using embedded time-codes even if the playback of the content is interrupted. Such an interruption can occur due to, for example, activating a pause or stop button, and then resuming the normal playback of the content at some time in the future. In one embodiment, information extracted from earlier playback sessions of the content are recorded in, for example, an extractor log. The stored information can be restored when playback resumes. With the restored EP information, the precise timing within actual playback (excluding pause and stop intervals) can quickly be achieved.

In some embodiments, a successful extraction of a payload embedded in one component of a content (such as an audio component of a multimedia content) facilitates the detection of a watermark that is embedded in another component (such as a video component) of the multimedia content. In one example, the detection of an audio watermark at a particular temporal location within the content triggers the detection of a video watermark that is located at a predefined position with respect to the detected temporal location. The coordinated watermark embedding and extraction operations across different content components can provide significant savings in computational operations. In particular, video watermark extraction is typically more computationally expensive than audio watermark extraction. On the other hand, video watermarks often can carry more information than audio watermarks and, therefore, can contain important information that cannot be carried by audio watermarks. Coordinated embedding and extraction of video and audio watermarks that is described in the above example embodiment triggers the expensive video processing operations that are needed for the extraction of video watermarks only upon the detection of the associated audio watermarks. It should be noted that the above-noted coordination among components of a content is not limited to audio and video components. For example, the extraction of watermarks in the center channel (i.e., high activity channel) of a multi-channel audio content may be triggered only upon the detection of an audio watermark in a low-activity channel (e.g., Left or Right channel) or a channel with limited frequency content (e.g., the sub-woofer).

The coordinated embedding and extraction of watermarks in accordance with the disclosed embodiments can enable a wide range of applications either individually or collectively in the fields of copy management and protection, content identification and/or forensic tracking of content delivery transaction.

In some embodiments, coordinated detection of the EP watermarks enhances the experience of the content user. As noted earlier, the primary objective of typical CCI watermarks is to limit unauthorized access to the content. For example, Advanced Access Content System (AACS) specifications indicate that if a No Home Use (NHU) mark is detected in a content accessed on a consumer device, the playback and copying of that content must be stopped. The AACS specifications further provide that in case of Trusted Source (TS) mark detection in audiovisual content in the clear (no encryption), the audio component of the content must be muted during the playback, after a predefined time interval (or grace period). Coordinated CCI and EP watermark extraction that are carried out in accordance with the disclosed embodiments further improve the consumer experience by offering some options beyond the strict enforcement of the CCI rules.

In one embodiment, a CCI enforcement operation is overruled when a specific set of conditions approved by the content owner is met. In one example, restrictive CCI enforcement operations are removed upon payment of a fee to the appropriate entity. For instance, upon the detection of a CCI and an associated EP watermark, a database is accessed and the information regarding the payment receiving entity is retrieved. In one variation, a portion of the EP watermark payload, such as the EID field, or the EID field and a range of SN values, is used to identify the content owner. To further enhance the user experience, in one example embodiment, the extractor monitors the embedded time-code information to verify that the entire content is correctly played back before closing the transaction and charging the customer account.

In other embodiments, restrictive CCI enforcement operations may be lifted without a payment, if the customer agrees to view (or listen to) a certain amount of advertisement during playback of the content. In one example, the advertisement is targeted (i.e., it is content-based). The content can be identified, for example, based on the extracted EP watermark information. Further, the advertisement can be inserted in particular segments of the content based on the detected value of the embedded time-codes. The inserted advertisements can be related in some way to the content with embedded watermarks. For example, if the content belongs to a particular studio, the advertisement can be a trailer about another movie from the same studio. In another example, the advertisement can be based on subject matter of the content. For instance, if the content is a movie about martial arts, the inserted trailer can be about another content belonging to the martial art genre. In still another example, during the movie scenes that relate to a tropical island, an advertisement about a tropical island resort may be inserted.

In some embodiments, the advertisements are streamed or downloaded from remote servers, while in other embodiments the advertisements are prepackaged with the content on a DVD, Blu-ray disc or Electronic Sell Through (EST) package. The advertisements can be inserted at the beginning, at the end, or in the middle of the content. When ads are placed in the middle of a content, they are typically inserted during the scene change and/or at a place where specific ads are considered appropriate by advertisement sponsors or agency. Time-codes that are carried by the EP watermarks in accordance with the disclosed embodiments can identify the precise insertion locations (e.g., with an accuracy of within a single video frame) of the advertisements. Furthermore, each time-code may associate a metadata describing the characteristics and categories of the content around the place where an advertisement may be inserted. The metadata may also describe what advertisements are appropriate for insertion into the content, and even specify a list of candidate advertisements.

It should be noted that the placement of advertisement within a content may require manual intervention that includes the selection of the insertion locations, the particular advertisements that are suitable for insertion and manual association of the relevant metadata during the coordinated embedding operations. For example, the embedder may allow the user to manually specify the places for advertisements as a starting point to embed a time-code. The embedder may further ask the user to enter the metadata associated with the time-code in a database for later use.

According to another embodiment, conditional access to the content is determined based on a content's age, such as elapsed time from public release of the content. For example, the enforcement of NHU mark may be lifted if the content is no longer shown in the theaters. Information related to a content's age can be accessed, for example, over the Internet from a database based on the extracted EP watermark values. In other embodiments, a pending CCI enforcement operation is lifted based on a content's quality (e.g. content resolution). For example, enforcement of a detected TS mark may be lifted if the content is presented in a standard-resolution format rather than a high-resolution format. In yet another embodiment, a pending CCI enforcement operation is lifted based on the region where the content is distributed, how the content is distributed and/or who distributed the content (the distribution channel or content source). For example, CCI enforcement may be lifted if the content is accessed from a specific location for promotion and marketing or other purposes. In another case, CCI enforcement may be lifted if the content comes from a specific content source where all contents in such source are legitimately licensed, or have been screened against CCI and fulfilled the CCI enforcement obligations prior to being distributed. Such policy of conditional access may be dynamically specified at any time when such CCI enforcement is performed in a networked environment, such as in a Content Distribution Network (CDN), a cloud distribution network, a networked device, or a Internet Service Provider (ISP).

In still other embodiments, instead of complete lifting of the CCI enforcement actions, the extraction of an EP watermark can lead to a delay of an enforcement action for the benefit of the consumers. For example, a feature movie may be distributed on Blu-ray discs with an audio track that is embedded with TS watermarks. During the playback of the movie, a user may start shooting a home video and inadvertently capture part of the movie's audio track. During the playback of the home video using a media player that is equipped with a watermark extractor, some TS watermarks may be extracted, thereby triggering a TS enforcement action. In order to mitigate this situation, AACS Licensing Authority (AACS LA) requires repeated TS detections over an extended interval (i.e. TS watermark detections should be found in at least seven out of nine consecutive 200-second long intervals). This requirement can, therefore, result in an uninterrupted playback of content with embedded TS marks for at least a 20-minute grace period. Note that this enforcement logic ensures that a new grace period is allowed when unmarked content is played for 10 minutes, which is known as the grace period reset interval. This solution reduces the likelihood of TS enforcements on home videos.

According to the disclosed embodiments, the likelihood of erroneous CCI enforcements can be further reduced if the extractors also observe time-codes and detect discontinuities, such as cuts or insertions in the content. The detection of discontinuities may, for example, trigger an extension of the grace period, or restart the grace period. In one example, if the detected discontinuity is larger than the grace period reset interval, the grace period can be restarted. However, if the detected discontinuity is smaller than the grace period reset interval, the enforcement logic may assume that unmarked content has been played for the period of time equal to the size of the detected discontinuity. The reduction of the likelihood of having erroneous enforcement actions based on discontinuity detection can further enable a reduction in the grace intervals, or otherwise allow adjustments to the enforcement logic to achieve better content protection.

Figure 8:
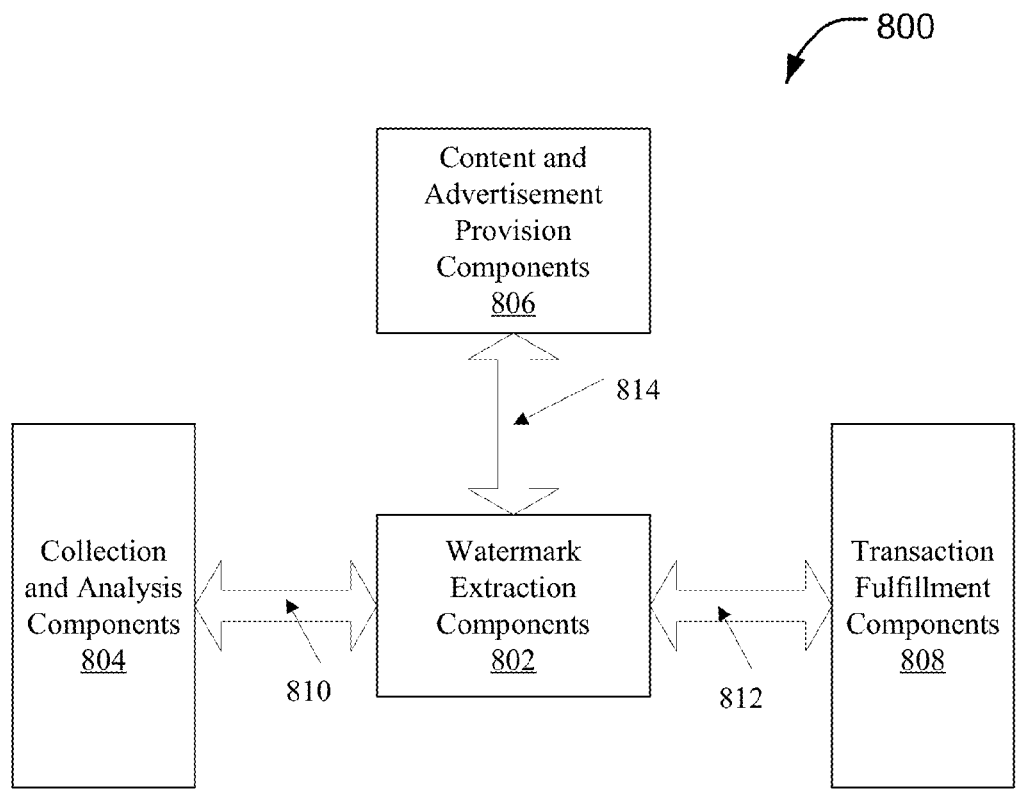
FIG. 8 illustrates collaborations between a watermark extractor and other entities in accordance with an example embodiment.

FIG. 8 provides is a block diagram of a system 800 that can provide enhanced user experience in accordance with an exemplary embodiment. The watermark extraction components 802 are responsible for extracting various watermark messages that are embedded within a content, such as CCI and EP watermarks. FIG. 8 does not depict the individual components within the watermark extraction components 802. It is understood, however, that the watermark extraction components 802 can comprise several components that assist in processing of a content to extract the embedded watermarks. The watermark extraction components 802 may further be part of a larger device or system, such as a portable consumer device, and may be implemented in hardware, software, and/or combinations thereof. The watermark extraction components 802 may also be part of a distributed system, where part of the extraction process is carried out at a remote device, such as a remote server.

The watermark extraction components 802 provide extraction results, such as the CCI and EP watermark values, user and device information, and other information, to the content and advertisement provision components 806 through the communication channel 814. The communication channel 814 may comprise wired or wireless communication channels. The content and advertisement provision components 806, in return, provide the watermark extraction components 802 with information such as metadata related to the content with embedded watermarks, recommendations on subsequent user and/or device actions, offers to purchase authorized copies of the content that is being played, referrals to other sources of content, targeted and/or contextual advertising, and other information. The content and advertisement provision components 806 may include one or more servers, general computing devices and/or specific devices and the associated software that are configured to receive and process information and commands from the watermark extraction components 802 and provide the appropriate response.

FIG. 8 also depicts the collection and analysis components 704 that are in communication with the watermark extraction components 802 through the communication channel 810. The collection and analysis components 804 collect and analyze usage behaviors associated with the watermark extraction components 802. The collection and analysis components 804 can further analyze consumption patterns, consumer behavior and business and market intelligence. The collection and analysis components 804 can comprise a plurality of servers, as well as hardware and/or software components that can be configured to perform the required collection and analysis. The watermark extraction components 802 may also be in communication with the transaction fulfillment components 808 through the communication channel 812. The transaction fulfillment components 808 conduct operations such as authentication, negotiation, payments, product delivery, and other operations that are needed to complete a transaction with the watermark extraction components 802 (or the device that incorporates the watermark extraction components 802).

Figure 9:
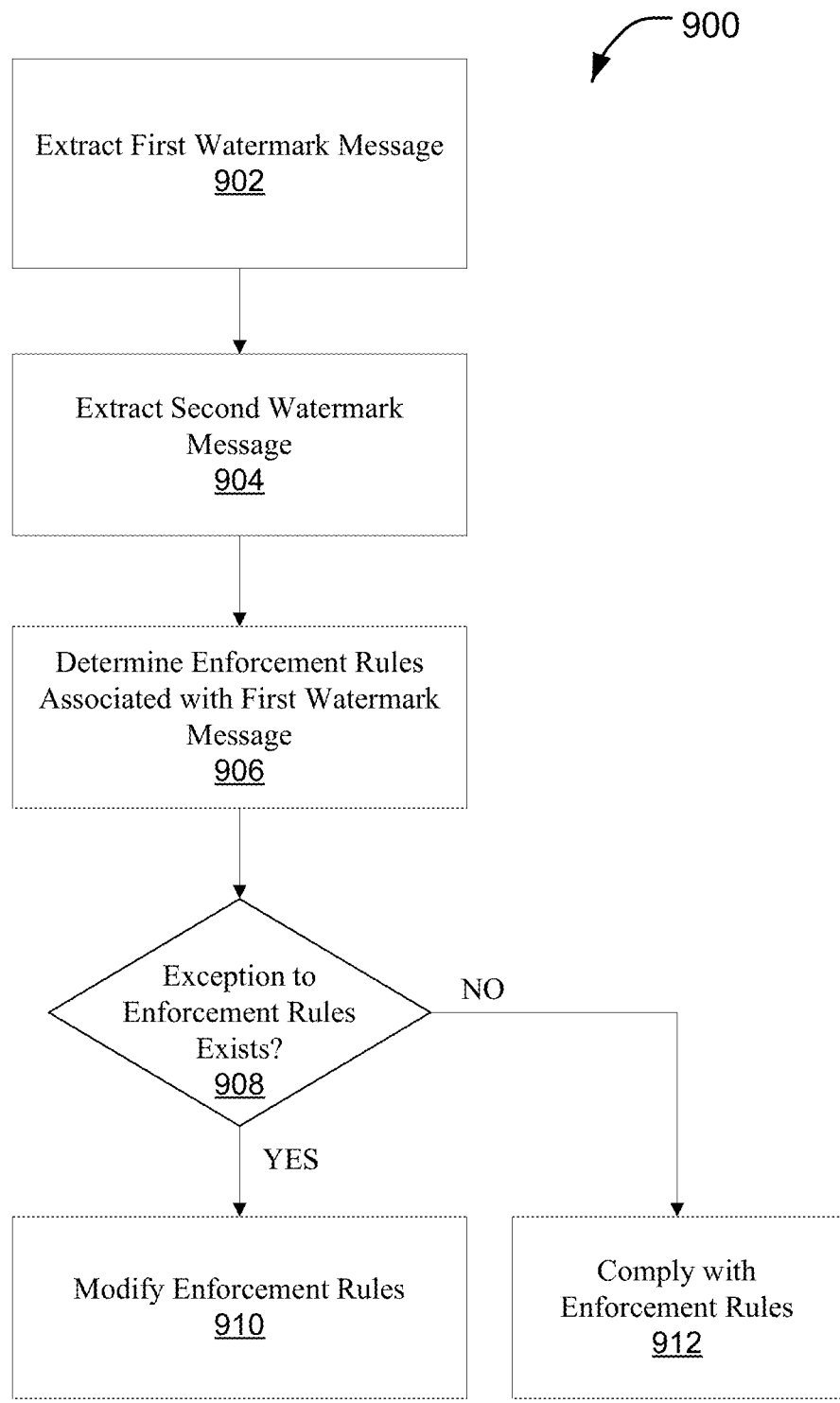
FIG. 9 a set of operations for extracting watermarks from a content in accordance with an exemplary embodiment.

FIG. 9 illustrates a set of operations 900 that are carried out as part of coordinated extraction of watermarks in accordance with an exemplary embodiment. At 902, one or more watermarks of a first message type (i.e., a first watermark message) are extracted from an embedded content. For example, the first watermark message can convey CCI information. At 904, one or more watermarks of a second message type (i.e., a second watermark message) are extracted from the content. In one example, the second watermark message is an extended payload (EP) watermark that can include an embedder identification field, a serial number filed, a time-code field, and others information. At 906, enforcement rules associated with the extracted first watermark message are determined. In one example where the first watermark message correspond to a CCI watermark, the associated enforcement rules can include any one of: stopping the playback and/or recording of the content immediately or after a particular grace period, muting at least a portion of an audio component of the content, providing a warning screen that is superimposed on the content, and the like.

Referring back to FIG. 9, at 908, it is determined if an exception to the enforcement rules exists. The determination at 908 can be conducted using the extracted second watermark message. In one example, the operations at 908 include identifying the content using at least a portion of the extracted second watermark message (e.g., the EID field within the second watermark message) and obtaining one or more exceptions that may be associated with the content. For instance, upon extraction of an EID value from the second watermark message, a remote database can be accessed to associate the extracted EID with metadata residing at the remote database. The metadata can include possible exceptions to the CCI enforcement rules associated with that content.

If at 908, the determination indicates that no exceptions are possible, the operations 900 continue to 912, where the existing enforcement policy is enforced. If, on the other hand, the determination at 908 indicates the existence of at least one exception to the enforcement rules, the operations 900 continue at 910, where the enforcement rules are modified. By the way of example, and not by limitation, such modifications can include providing the user with a payment option that allows the user to view the content, enabling the viewing of the content based on the content's age, modifying the quality of the content, enabling the user to view the content upon the user's agreement to view certain advertisements, and other operations. In some embodiments, extraction of additional watermark messages continues while the content is being conditionally accessed. Based on the additionally extracted watermark messages, it can be verified whether or not conditional access to the content has been fulfilled. For example, each of the second watermark message and the additionally extracted watermark messages can each include a time-code that can be used to determine if all, or substantially all of the time-codes associated conditionally accessible portions of the content have been extracted. This way, the consumer can be charged only upon viewing/receiving the entire content, or offered a refund or other incentives if the content is not fully received and/or viewed by the user.

The disclosed embodiments further provide a significantly improved user experience even in scenarios where CCI enforcement rules are left intact. In one example, the user may be informed that the content is available for free downloading at certain distributor sites if the user is willing to enter into a trial subscription. Alternatively, the user may be provided with information as to how the content can be best accessed through legitimate channels, such as play times in nearby theaters, the release date of the content on cable and DVD formats, and other renting or purchasing opportunities on the web. Further, the customer may be offered alternate, legitimate content that closely matches the identified content. The customer may also be offered with critics' ratings and comments, review, trailers, behind scene stories of the content and the like. Such enhanced response associated with CCI enforcement rules may be customized based on one or more sources of information. For example, such enhanced responses may be provided based on one or more of the following: 1) the content handling device information such as device manufacturer, model and/or firmware version; 2) geographic information of the user (e.g., based on registered account information) or device (e.g., IP address for a networked device); 3) user profile such as age, preference, and history; 4) the subject matter of the content; and 5) content release information such as release date, format, languages, etc.

In accordance with some embodiments, the extraction of EP watermarks can be valuable to the consumer even if no CCI enforcement action is pending. For example, the TS mark may be detected in a content that is encrypted and protected with an approved digital rights management (DRM) technology. As such, the content is not subject to a CCI enforcement action. However, the metadata associated with the content may be lost in the content distribution channel, for example, during various format conversions, or the device may not be capable of locating the metadata in each content container. Since watermark data persistently stays with the content, it may be simpler to use the extracted EP watermarks to access the needed metadata from a database, regardless of the content container type and format conversion protocols. The retrieved metadata can be used to access additional information about the content over the Internet, to play games, socialize with other content users or fans, purchase related merchandise, get behind-the scene stories, and the like.

Figure 10:
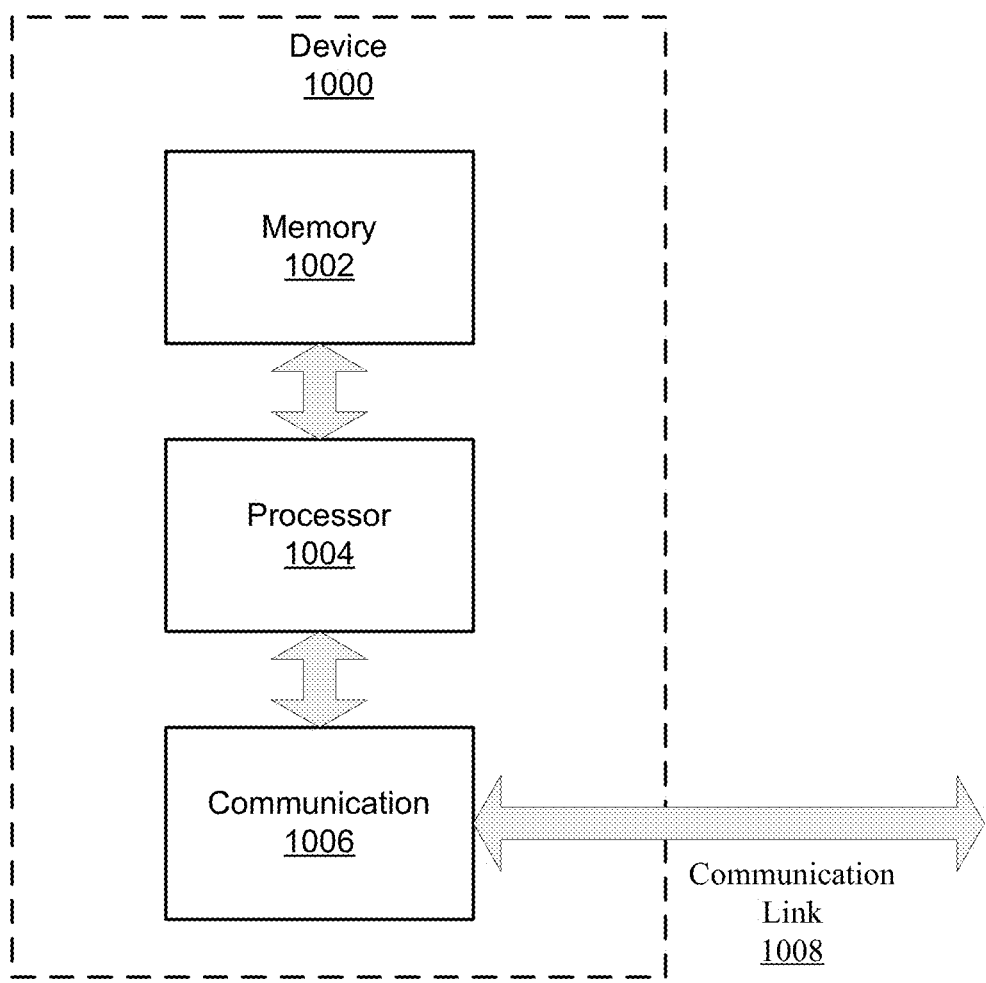
FIG. 10 illustrates a block diagram of an exemplary device that can accommodate the disclosed embodiments.

It is understood that the various embodiments of the present invention may be implemented individually, or collectively, in devices comprised of various hardware and/or software modules and components. These devices, for example, may comprise a processor, a memory unit, an interface that are communicatively connected to each other, and may range from desktop and/or laptop computers, to consumer electronic devices such as media players, mobile devices and the like. For example, FIG. 10 illustrates a block diagram of a device 1000 within which the various disclosed embodiments may be implemented. The device 1000 comprises at least one processor 1002 and/or controller, at least one memory 1004 unit that is in communication with the processor 1002, and at least one communication unit 1006 that enables the exchange of data and information, directly or indirectly, through the communication link 1008 with other entities, devices, databases and networks. The communication unit 1006 may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. The exemplary device 1000 that is depicted in FIG. 10 may be integrated into as part of a content handling device and/or a watermark embedder 100 and a watermark extractor 700 that are depicted in FIGS. 1 and 7, respectively.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application comprise non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. A content that is embedded with watermarks in accordance with the disclosed embodiments may be stored on a storage medium. In some embodiments, such a stored content that includes one or more imperceptibly embedded watermarks, when accessed by a content handling device (e.g., a software or hardware media player) that is equipped with a watermark extractor, can trigger a watermark extraction process, the associated signal processing operations, as well as subsequent operations by the watermark extractor and/or the content handling device.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   extracting an embedded first watermark message from a content by a watermark extractor that is implemented at least partially in hardware, wherein the content includes the first embedded watermark message, a second embedded watermark message and additional watermark messages embedded therein, and wherein the embedded first watermark message is a copy control watermark and copy control rules associated with the extracted first watermark message prohibits unconditional access to the content;
   extracting the embedded second watermark message from the content, wherein the second watermark message includes a different value than the first watermark message;
   based on the extracted second watermark message, determining whether or not an exception to the copy control rules exists, and upon a determination that an exception to the copy control rules exists;
   enabling a conditional access to the content;
   extracting the additional watermark messages from the content while the content is being conditionally accessed; and
   based on the additionally extracted watermark messages, verifying that the conditional access to the content has been fulfilled for at least the sections of the content that include the additionally extracted watermark messages, wherein verifying that the conditional access to the content has been fulfilled includes determining whether all or only sections of the content that are subject to the conditional access have been accessed, and triggering an additional action upon a determination that only sections of the content that are subject to the conditional access have been accessed, wherein the copy control rules associated with the first watermark message are applicable to the content as initially released to public, and the second watermark message enables the determination as to whether or not a new exception to the copy control rules exists based on elapsed time from the initial public release date of the content.

2. The method of claim 1, wherein:
each of the extracted second watermark message and the additionally extracted watermark messages comprises a time-code; and
verifying that the conditional access has been fulfilled comprises determining whether or not all time-codes associated conditionally accessible portions of the content have been extracted.

3. The method of claim 1, wherein
each of the extracted second watermark message and the additionally extracted watermark messages comprises a time-code; and
the exception to the copy control rules comprises allowing access to the content in exchange for viewing of an advertisement that is played back simultaneously with the content during a specific time interval as determined by the time-codes of the extracted second watermark message and the additionally extracted watermark messages.

4. The method of claim 3, wherein the advertisement is selected based on the subject matter of the content during the specific time interval.

5. The method of claim 1, wherein the additional action includes providing a refund or an incentive for the sections of the content that are subject to conditional access but have not been accessed.

6. The method of claim 1, wherein:
an exception to the copy control rules does not exist; and
an alternative to accessing the content is offered to a user.

7. The method of claim 6, wherein the alternative comprises at least one of: directing the user to a web site where a version of the content can be obtained, informing the user of content show times at one or more movie theatres, a recommendation of similar content, or a date on which the content becomes available for sale or rent.

8. The method of claim 1, wherein determining whether or not an exception to the copy control rules exists comprises:
obtaining an identification value associated with the extracted second watermark message; and
obtaining information indicative of available exceptions to the copy control rules from a database that comprises metadata associated with the identification value.

9. The method of claim 8, wherein the metadata is further used to carry out at least one of:
accessing additional information about the content using the Internet,
playing games,
interacting with other consumers of the content using a social network, or
purchasing merchandise related to the content.

10. A device, comprising:
a watermark extractor that is implemented at least partially in hardware and configured to extract an embedded first watermark message from a content, wherein the content includes the first embedded watermark message, a second embedded watermark message and additional watermark messages embedded therein and wherein the embedded first watermark message is a copy control watermark and copy control rules associated with the extracted first watermark message prohibits unconditional access to the content, the watermark extractor further configured to:
extract the embedded second watermark message from the content, wherein the second watermark message includes a different value than the first watermark message;
upon a determination that an exception to the copy control rules exists, enable a conditional access to the content;
extract the additional watermark messages from the content while the content is being conditionally accessed, and
based on the additionally extracted watermark messages, verify that the conditional access to the content has been fulfilled, wherein verification that the conditional access to the content has been fulfilled includes a determination as to whether all or only sections of the content that is subject to the conditional access has been accessed, and trigger of an additional action upon a determination that only sections of the content that are subject to the conditional access have been accessed; and
a watermark assessment component configured to determine, based on the extracted second watermark message, whether or not an exception to the copy control rules exists for at least the sections of the content that include the additionally extracted watermark messages, wherein the copy control rules associated with the first watermark message are applicable to the content as initially released to public, and the second watermark message enables the determination as to whether or not a new exception to the copy control rules exists based on elapsed time from the initial public release date of the content.

11. The device of claim 10, wherein:
each of the extracted second watermark message and the additionally extracted watermark messages comprises a time-code; and
the watermark extractor is configured to verify that the conditional access has been fulfilled by, at least in-part, determining whether or not all time-codes associated conditionally accessible portions of the content have been extracted.

12. The device of claim 10, wherein:
each of the extracted second watermark message and the additionally extracted watermark messages comprises a time-code; and
the exception to the copy control rules comprises allowing access to the content in exchange for viewing of an advertisement that is played back simultaneously with the content during a specific time interval as determined by the time-codes of the extracted second watermark message and the additionally extracted watermark messages.

13. The device of claim 12, wherein the advertisement is selected based on the subject matter of the content during the specific time interval.

14. The device of claim 10, wherein:
an exception to the copy control rules does not exist; and
an alternative to accessing the content is offered to a user.

15. The device of claim 14, wherein the alternative comprises at least one of: directing the user to a web site where a version of the content can be obtained, informing the user of content show times at one or more movie theatres, a recommendation of similar content, or a date on which the content becomes available for sale or rent.

16. The device of claim 10, wherein the watermark extractor is configured to determine whether or not an exception to the copy control rules exists by at least in-part:
obtaining an identification value associated with the extracted second watermark message; and
obtaining information indicative of available exceptions to the copy control rules from a database that comprises metadata associated with the identification value.

17. The device of claim 16, wherein the metadata is further used to carry out at least one of:
accessing additional information about the content using the Internet,
playing games,
interacting with other consumers of the content using a social network, or
purchasing merchandise related to the content.

18. A device comprising:
a processor; and
a memory comprising processor executable code, the processor executable code, when executed by the processor, configures the device to:
extract an embedded first watermark message from a content, wherein the content includes the first embedded watermark message, a second embedded watermark message and additional watermark messages embedded therein and wherein the embedded first watermark message is a copy control watermark and copy control rules associated with the extracted first watermark message prohibits unconditional access to the content;
extract the embedded second watermark message from the content, wherein the second watermark message includes a different value than the first watermark message;
based on the extracted second watermark message, determine whether or not an exception to the copy control rules exists, and upon a determination that an exception to the copy control rules exists;
enable a conditional access to the content;
extract additional watermark messages from the content while the content is being conditionally accessed; and
based on the additionally extracted watermark messages, verify that the conditional access to the content has been fulfilled for at least the sections of the content that include the additionally extracted watermark messages, wherein verification that the conditional access to the content has been fulfilled includes a determination as to whether all or only sections of the content that is subject to the conditional access has been accessed, and trigger of an additional action upon a determination that only sections of the content that are subject to the conditional access have been accessed, wherein the copy control rules associated with the first watermark message are applicable to the content as initially released to public, and the second watermark message enables the determination as to whether or not a new exception to the copy control rules exists based on elapsed time from the initial public release date of the content.

19. A computer program product, embodied on a non-transitory computer readable medium, comprising a set of program codes, when executed by a processor, the set of program codes causes the processor to perform a set of operations, the operations comprising:
extracting an embedded first watermark message from a content, wherein the content includes the first embedded watermark message, a second embedded watermark message and additional watermark messages embedded therein and wherein the embedded first watermark message is a copy control watermark and copy control rules associated with the extracted first watermark message prohibits unconditional access to the content;
extracting the embedded second watermark message from the content, wherein the second watermark message includes a different value than the first watermark message;
based on the extracted second watermark message, determining whether or not an exception to the copy control rules exists, and upon a determination that an exception to the copy control rules exists;
enabling a conditional access to the content;
extracting the additional watermark messages from the content while the content is being conditionally accessed; and
based on the additionally extracted watermark messages, verifying that the conditional access to the content has been fulfilled for at least the sections of the content that include the additionally extracted watermark messages, wherein verifying that the conditional access to the content has been fulfilled includes determining whether all or only sections of the content that is subject to the conditional access has been accessed, and triggering an additional action upon a determination that only sections of the content that are subject to the conditional access have been accessed, wherein the copy control rules associated with the first watermark message are applicable to the content as initially released to public, and the second watermark message enables the determination as to whether or not a new exception to the copy control rules exists based on elapsed time from the initial public release date of the content.

* * * * *